US007902490B2

(12) United States Patent
DiDomenico

(10) Patent No.: US 7,902,490 B2
(45) Date of Patent: Mar. 8, 2011

(54) SOLID-STATE SUN TRACKER

(75) Inventor: Leo David DiDomenico, Livermore, CA (US)

(73) Assignee: Xtreme Energetics, Inc., Livermore, CA (US)

( * ) Notice: Subject to any disclaimer, the term of this patent is extended or adjusted under 35 U.S.C. 154(b) by 1026 days.

(21) Appl. No.: 11/700,751

(22) Filed: Jan. 30, 2007

(65) Prior Publication Data

US 2008/0178867 A1    Jul. 31, 2008

(51) Int. Cl.
*G01J 1/00* (2006.01)
*F24J 2/00* (2006.01)
*F24J 2/38* (2006.01)

(52) U.S. Cl. ........................ 250/203.4; 126/573; 136/243

(58) Field of Classification Search ............... 250/203.1, 250/203.4; 126/573; 136/243
See application file for complete search history.

(56) References Cited

U.S. PATENT DOCUMENTS

| | | | |
|---|---|---|---|
| 4,754,185 A | 6/1988 | Gabriel | |
| 5,585,683 A | 12/1996 | Higuchi | |
| 5,717,515 A | 2/1998 | Sheridon | |
| 5,754,332 A | 5/1998 | Crowley | |
| 5,808,783 A | 9/1998 | Crowley | |
| 5,869,916 A | 2/1999 | Suzuki | |
| 5,914,805 A | 6/1999 | Crowley | |
| 5,940,054 A | 8/1999 | Harris | |
| 5,965,968 A | 10/1999 | Robert | |
| 6,055,091 A | 4/2000 | Sheridon | |
| 6,072,621 A | 6/2000 | Kishi | |
| 6,097,531 A | 8/2000 | Sheridon | |
| 6,120,588 A | 9/2000 | Jacobson | |
| 6,174,153 B1 | 1/2001 | Sheridon | |
| 6,192,890 B1 | 2/2001 | Levy | |
| 6,612,705 B1 | 9/2003 | Rabinowitz | |
| 6,657,359 B1 | 12/2003 | Hoen | |
| 6,698,693 B2 | 3/2004 | Rabinowitz | |
| 6,957,894 B2 | 10/2005 | Rabinowitz | |
| 6,964,486 B2 | 11/2005 | Rabinowitz | |
| 6,987,604 B2 | 1/2006 | Rabinowitz | |
| 6,988,809 B2 | 1/2006 | Rabinowitz | |
| 7,077,361 B1 | 7/2006 | Rabinowitz | |
| 7,112,253 B2 | 9/2006 | Rabinowitz | |
| 7,130,102 B2 | 10/2006 | Rabinowitz | |
| 7,133,183 B2 | 11/2006 | Rabinowitz | |
| 2008/0178867 A1 * | 7/2008 | DiDomenico | 126/573 |

OTHER PUBLICATIONS

Web Site: http://www.aml.t.u-tokyo.ac.jp/research/es_motor/pim_e.html, (Jan. 30, 2007).

* cited by examiner

*Primary Examiner* — John R Lee
(74) *Attorney, Agent, or Firm* — Leighton K. Chong

(57) ABSTRACT

This invention deals with the general topic of adaptive non-imaging tracking of the sun. A transmission-mode electro-optical system is presented for solar energy tracking and collection. The scale of the system may range from small portable systems to large-scale industrial power plants used for the production of environmentally benign energy. It maybe integrated directly into buildings and other platforms without the need for heliostats to hold photovoltaic cells or other energy conversion devices above the building or other host platform. It makes solar energy harvesting systems practical by allowing the separation of tracking, collection, concentration, aggregation, distribution, and energy conversion. This novel system is unique and distinct from other sun tracking and energy conversion systems because it allows adaptive solid-state electronics to be used in place of conventional mechanical tracking heliostats. Furthermore, it is highly precise and therefore allows very high levels of concentration to be achieved in an dynamic environment. It is also cost effective because it leverages integrated opto-electronics instead of mechanical devices to perform sun tracking.

42 Claims, 17 Drawing Sheets

ANALYSIS OF PRIOR ART

SOLID-STATE SUN TRACKER

CROSS-REFERENCE TO RELATED APPLICATIONS

Not Applicable

FEDERALLY SPONSORED RESEARCH

Not Applicable

SEQUENCE LISTING OR PROGRAM

Not Applicable

BACKGROUND OF THE INVENTION

1. Field of the Invention

The world's supply of oil, natural gas, coal, and uranium are becoming depleted due to exponential growth in population and the need for every greater amounts of energy to satisfy the resulting economic growth. Furthermore, the pollution from the widespread use of these fuels has caused tremendous concern over the possibility of catastrophic widespread and irreversible environmental damage, such as, but not limited to, global warming. Clearly there is a limit to growth in a world constrained by finite resources and a finite ability of the environment to absorb the pollution of human activities. To help overcome the limitations of conventional fuels the use of the energy from our sun would appear to offer many advantages, such as its pollution free quality and its pervasive global distribution, if only it could be harvested in a cost effective and efficient way using devices that only require a relatively small investment in energy and pollution for their manufacture. This invention directly addresses the problem of creating an efficient, low-cost, and easily manufacturable solar tracker and collector, thereby providing a means to directly tape the energy resources of the sun by either replacing or augmenting the performance of solar concentrators with a solid-state electro-optic sun tracker that is capable of adapting to changing environmental lighting conditions.

In general, solar concentrators increase the flux of solar energy through a give area. This in turn can be used to maximize the power output of photovoltaic cells, which are significantly and nonlinearly improved in performance when irradiated by intense sunlight. Specially designed solar cells, which are optimized for use in intense sunlight, are capable of producing more output power than a large area of solar cells at a lower concentration due to the increased quantum efficiency of the cells in this intense light environment. Concentrators also provide a means to confine solar energy into a small cross-sectional area light-guide, thereby making solar energy distribution practical for a variety of uses. Unfortunately, solar concentrators have an intrinsically narrow field of view—diminishing with increasing concentration. This necessitates the use of some kind of tracking device to follow the sun's motion.

More specifically, the present invention relates to the field of electronically controllable and adaptable solid-state solar trackers that are based on predominantly flat optical boundaries which refract the sunlight and have a reconfigurable orientation. This optical boundary provides a means to direct light into a desired direction for the purpose of collection, concentration, distribution, and conversion of the sunlight into other end-use energy products.

Furthermore, this invention is less expensive and less resource intensive to manufacture than other solar energy harvesting technologies because it allows solar harvesting to be integrated directly into buildings and other structures without the outward mechanical infrastructure that is typical of conventional solar technologies. That is, it dramatically reduces the balances of systems infrastructure costs. The present invention is solid-state, has a very thin profile allowing it to cover large areas of structures such as, but not limited to, buildings aircraft, satellites, ocean vessels, and solar farming structures. Additionally, this invention allows the use of the best of breed in solar concentrator optics and concentrating solar cells or it can even be used as a stand-alone concentrator technology. Its versatility and adaptability make it an ideal candidate for small-scale domestic solar energy applications or large-scale industrial power-plants.

2. Description of the Prior Art

There are several recent efforts to adapt a twisting ball concept for use in solar energy collection and concentration. Additionally, There are many patents that explicitly show the use of twisting balls, called gyricons, for use in electronic paper and display technology. No other prior art appears to utilize the balls to optically concentrate or focus the sunlight by using a process of refraction within the twisting balls. Furthermore, the prior art neither teaches or anticipates our application of adaptive transmission-mode solar tracking. From the point of view of this patent the more recent prior art patent applications related to solar energy concentration using rotating optical devices are significant, however, they have many disadvantages as are considered in detail below.

The more recent prior art patents are related to using twisting ball technology in a reflection mode only. The prior art of reflection mode twisting ball solar trackers and concentrator has a number of significant disadvantages. In contradistinction, later it will be shown how the advantages of a refraction mode device, can overcome the disadvantages of the prior art.

Both the solar twisting ball concept and the gyricons used in displays are active devices that rotate either a ball or cylinder by use of electric or magnetic fields with the intent of utilizing these rotating structures in either diffuse or specular reflection. Much emphasis has been placed on the use of a quasi-electrostatic drive of the twisting balls and cylinders due to the ability for low power draw. Unfortunately, much of the prior art shows electrostatic motors with high complexity, low precision, and relatively high power dissipation even though the electrostatic motor technology has a longer history than the magnetic induction motor. Indeed, the first simple electrostatic motors were actually developed in the 1750's by Benjamin Franklin and Andrew Gordon. Subsequently, electret based electrostatic motors were invented in 1961 by a Russian physicist, A. N. Gubkin. His motor is based on an electret materials made in 1922 by Mototaro Eguchi, professor of physics at the Higher Naval College in Tokyo. Many different embodiments have evolved since the original principle was reported none of which teaches or anticipates the use of the electrostatic motor for controlling a transmission mode solar tracking device as described in this invention.

The disadvantages listed below apply to many inventions. However, the disadvantages listed below are especially pertinent with regard to the inventions of Mario Rabinowitz et. al. and Toshiro Higuchi et. al., which are explicitly listed later in this document.

The first disadvantage of the prior art is that it mimics the functionality of large curved surface reflectors, such as mirrored parabolic concentrators, which require a mast structure at the focal point to hold the receiver and collect the concentrated solar radiation. This mechanical mast structure adds to the balance of systems costs for the system and is not compatible with compact integrated solar energy collection, concentration, and distribution devices.

The second disadvantage of the prior art is that the mirror technology used is based on thin metallic films which are sandwiched between an upper and lower hemisphere of transparent dielectric. These metallic films are very difficult to manufacture with low ohmic losses. The result is that any practical metallic mirror will typically have losses that can range from about 2% to 20% depending on the process used and the resulting purity of the metal and it's surface roughness. The lower loss mirrors cost significantly more to fabricate, especially when incorporated into very small dielectric balls or cylinders.

A third disadvantage of the prior art is that the metallic mirrors also interact with the switching electric fields to produce ohmic losses via eddy currents. Although the power loss in an individual twisting ball is tinny, the total loss from many millions of twisting balls can be quite large. This reduces the efficiency of the overall solar harvesting process.

A fourth, and extremely significant, disadvantage of the prior art is that the reflection mode operation has an intrinsic shadow loss directly related to the use of a mirror. This is because when an array of twisting balls or cylinders is closely packed, as is the case when collecting and concentrating sunlight, part of the reflected energy from one mirror is reflected onto the backside of an adjacent mirror whenever the solar source is not directly in front of the mirrors, which is almost always the case. That is to say, an array of tilted close-packed mirrors partially shadows itself due to geometric considerations.

A fifth disadvantage of the prior art utilizing reflection mode optics is that it cannot be integrated in intimate contact with other optical devices because the input surface and the output surface are the same. Hence, the inclusion of, for example, an optical output lens directly on top of the reflection mode array would interfere with the input of the light. In contradistinction, a trans-mission mode device would allow direct integration of the twisting ball solar tracker with optical structures, thereby reducing the volume of integrated optics for solar collection, concentration, distribution, and conversion devices.

A sixth disadvantage of the prior art is that it requires significant currents to induce the required electric fields to twist large numbers of balls and embedded mirrors over large distances. The prior art attempts to overcomes this difficulty by periodically resetting the twisting balls in order to track the sun instead of maintaining a control electromagnetic field. However, this requires that the prior art have two modes. The first mode is the dynamic mode where in the twisting balls are moved in accordance with the applied electric fields. The second mode is a mechanical stabilization mode where mechanical forces are applied to hold the twisting balls between dynamic updates. The mechanical stabilization is achieved by one of a number of possible techniques, such as but not limited to, piezo-electrics, fluid pressure, and ancillary electric or magnetic moments that are engaged to produce forces for the stabilization mode. Furthermore, because all the driving electrodes are typically quite far from the moving structures large voltage supplies are required.

A seventh disadvantage of the prior art is that it does not adequately address the problem of pointing accuracy or pointing precision. Pointing accuracy is related to the absolute error in solar tracking and pointing precision is related the relative error in solar tracking. The accuracy and the precision of orientating balls or cylinders, and hence redirecting light, directly impacts the performance of the subsequent solar concentration process due to the limitations imposed by the principle of conservation of etendue—which is based on a phase space approach to light focusing dynamics. The prior art is useful only for the relatively low pointing accuracies needed for concentrations on the order of 10 suns. That is 10 times the normal one sun concentration. In applications that require concentrations that are on the order of 1000 suns, 10,000 suns, or even as high as about 100,000 suns—which is near the thermodynamic limit of concentration in a homogenous, isotropic, and linear dielectric medium—a more robust means of providing the required pointing accuracy and precision is needed. Additionally, a means must exist to overcome the segmented nature of light redirected from a discrete twisting ball. This discrete nature of reflection mode twisting balls and cylinders tends to limit the maximum achievable concentration when arrays of twisting structures attempt to directly focus light to a common focal point directly. Such focusing problems would not exist if the array of twisting mirrors used in the prior art only were used to redirect the input light so that an intermediary high-performance solar concentrator could be used to perform the concentration. The prior art neither teaches or discusses this important issue for high performance solar concentration.

An eighth disadvantage of the prior art, especially with regard to electrostatic motors, is that it shows electrostatic stepping-motor actuation based on three or more phases of interdigitated electrodes on a single stator. An example of this is shown in the prior art of FIG. 5. In principle, only two phases are really needed so long as a means exists to form a perturbation to cause the rotor to be assigned a specific direction of travel.

A ninth disadvantage of the prior art, especially with regard to electrostatic motors, is that it shows electrostatic stepping-motors that do not optimally utilize the electrode geometry. In particular, for a given pitch between electrodes an optimal resolution of travel of only one pitch length should be achievable in theory. The prior art does not achieve this theoretical limit and therefore wastes precious area resources needlessly.

A tenth disadvantage of the prior art, especially with regard to electrostatic motors, is that the multi-phase nature of the electrode voltage distributions necessitates the use of complex geometries to make the electronic connections. Such complexity would reduce the transmission of the light through any optics due to the non-zero absorption of each layer of imperfectly transparent conductors, such as but not limited to, Zinc Tin Oxide (ZTO) and indium Tin Oxide (ITO).

An eleventh disadvantage of the prior art, especially with regard to electrostatic stepping motors, is that it does not integrate optics into the functionality of the stator, rotor, or slider.

A twelfth disadvantage of the prior art in electrostatic stepping motors is that the electrical interconnections of three of more phases of belt-like electrodes requires that the electrical interconnections are distributed on more than one layer of dielectric. This requires complex fabrication and introduces the possibility for electrical cross talk in an environment of high voltages that are typical in electrostatic motor design.

It also appears that none of the prior art associated with display technology utilizes twisting balls or cylinders to optically concentrate, or focus, light using transmission mode, also called refraction mode, optics, as is done in this present invention. Furthermore, the prior art neither teaches nor anticipates the use of twisting ball or cylinder technology for solar energy conversion applications. Furthermore, the prior art neither teaches or anticipates the use of twisting ball or cylinder technology as a means to functionally separate solar energy harvesting into four distinct steps: collection, concentration, distribution, and energy conversion.

The following are a list of the issued patents that use twisting ball or cylinder technology (gyricons) explicitly for solar concentration. These patents clearly do not anticipate, or show in any way, the use of a refraction mode twisting balls and twisting cylinders for solar tracking and concentration.

U.S. Pat. No. 6,612,705 issued to Mark Davidson and Mario Rabinowitz on Sep. 2, 2003 deals with reflection mode mini-optic twisting balls and twisting cylinders that use metallic mirrors for reflection and electric and magnetic addressing.

U.S. Pat. No. 6,698,693 issued to Mark P. Davidson and Mario Rabinowitz on Mar. 2, 2004 deals with solar propulsion assist using reflection mode mini-optic twisting balls and twisting cylinders.

U.S. Pat. No. 6,957,894 issued to Mario Rabinowitz on Oct. 25, 2005 deals with group alignment of reflection mode micro-optic twisting balls and twisting cylinders using induced electric dipoles.

U.S. Pat. No. 6,964,486 issued to Mario Rabinowitz on Nov. 15, 2005 deal with alignment of reflection mode solar concentrator micro-mirrors by augmentation induced electric dipoles with permanent electric dipoles.

U.S. Pat. No. 6,987,604 issued to Mario Rabinowitz and David Vincent Overhauser on Jan. 17, 2006 deals with manufacture of low friction rotatable arrays of reflection mode microoptic twisting balls and twisting cylinders.

U.S. Pat. No. 6,988,809 issued to Mario Rabinowitz on Jan. 24, 2006 deals with reflection mode solar concentration systems using micro-optic twisting balls and twisting cylinders.

U.S. Pat. No. 7,077,361 issued to Mario Rabinowitz on Jul. 18, 2006 deals with reflection mode micro-optics concentrator systems for solar power satellites.

U.S. Pat. No. 7,112,253 issued to Mario Rabinowitz on Sep. 26, 2006 deals with manufacturing reflection mode mini-balls for solar energy concentrators and related applications.

U.S. Pat. No. 7,130,102 issued to Mario Rabinowitz on Oct. 31, 2006 deals with reflection illumination and projection systems that use reflection mode mini-balls having metallic mirrors.

U.S. Pat. No. 7,133,183 issued to Mario Rabinowitz on Nov. 7, 2006 deals with reflection mode micro-optics solar concentrators based on mini-optic twisting balls and twisting cylinders that use metallic mirrors for reflection and electric and/or magnetic addressing.

There are also serious disadvantages and fundamental distinctions of kind associated with other patents that use twisting balls in display technology. These technologies are called by various names such as electronic-paper, e-paper, or gyricon. It appears that none of the prior art associated with display technology utilizes the twisting balls to optically concentrate, or focus, light as is done in this present invention. Furthermore, the prior art neither teaches nor anticipates the use of optical transmission mode twisting ball or cylinder technology in for solar energy conversion applications. The following is a representative sample from the large body of gyricon and gyricon-like patents used in display technology.

U.S. Pat. No. 5,717,515 issued to N. K. Sheridon on Feb. 10, 1998 deals with gyricon display technology.

U.S. Pat. No. 5,754,332 issued to J. M. Crowley on May 19, 1998 deals with gyricon two-colored twisting balls having reflectance comparable to white paper for monolayer gyricon displays.

U.S. Pat. No. 5,808,783 issued to J. M. Crowley on Sep. 15, 1998 deals with gyricon two-colored twisting balls having high reflectance properties for use as a white paper replacement.

U.S. Pat. No. 5,914,805 issued to J. M. Crowley on Jun. 22, 1999 deals with the use of two sets of gyricon two-colored twisting balls with enhanced reflectance properties.

U.S. Pat. No. 5,940,054 issued to Ellis D. Harris on Aug. 17, 1999 deals with the use of the friction induced electric charges (Triboelectric effect) on optical elements to the purpose of inducing motion of the optical elements.

U.S. Pat. No. 6,055,091 issued to N. K. Sheridon and J. M. Crowley on Apr. 25, 2000 and shows the use of gyricon two-color cylinders for electronic displays.

U.S. Pat. No. 6,072,621 issued to E. Kishi, T. Yagi, and T. Ikeda on Jun. 6, 2000 and shows how sets of different single-colored polarized twisting balls can be use in a display device.

U.S. Pat. No. 6,097,531 issued to N. K. Sheridon on Aug. 1, 2000 describes a method for constructing magnetized twisting balls or cylinders for gyricon displays.

U.S. Pat. No. 6,120,588 to J. M. Jacobson on Sep. 19, 2000 shows an electronically addressable single color display.

U.S. Pat. No. 6,174,153 issued to N. K. Sheridon on Jan. 16, 2001 describes an addressable gyricon display.

U.S. Pat. No. 6,192,890 B1 issued to D. H. Levy and J. P. F. Cherry on Feb. 27, 2001 describes a reconfigurable display sign using magnetic and electric fields to reorient the particles in the display.

There are also serious disadvantages in the prior art of electrostatic motors. The prior art is either too complex, or does not have sufficient resolution for high-performance concentration.

U.S. Pat. No. 4,754,185 issued to Kaigham J. Gabriel, Robert K. Prud'Homme and William S. N. Trimmer on Jun. 28, 1988 describes an electrostatic actuator having electrodes on both the stator and rotor.

U.S. Pat. No. 5,585,683 issued to Toshiro Higuchi, Saku Egawa, Massao Hiyane, and Katsuhide Natori on Dec. 17, 1996 describes an electrostatic actuator having a plurality of belt-like electrodes positioned only on the stator or only on the rotor, which are driven with three or more voltage pulsed phases, wherein at least one of the phases is needed for avoiding an unpredictable bi-stable state found in systems composed of only two voltage driving phases. This meta-stable state causes the direction of travel of any of the actuators described therein to be indeterminant without at least a third set of electrodes, having a direction discriminating voltage. These direction discriminating electrodes are periodic and are intermingled with the other belt-like electrodes. The phases and function of each set of electrodes permutating with each discrete step of said electrostatic stepping motor. This prior art neither teaches or anticipates any techniques to avoid the meta-stable state by using other techniques other than one or more sets of periodic belt-like electrodes intermingled the other electrodes. This problem is directly addressed in the current invention in the context of a movable transmission mode optical device for solar tracking.

U.S. Pat. No. 5,869,916 issued to Hidetoshi Suzuki and Takeshi Tanaka on Feb. 9, 1999 describes an electrostatic actuator having electrodes on both the stator and rotor.

U.S. Pat. No. 5,965,968 issued to Phillippe Robert, Jean-Sebastien Danel, and Bernard Diem on Oct. 12, 1999 describes an electrostatic actuator driven by deformation waves induced by electric fields.

U.S. Pat. No. 6,657,359 issued to Storrs Hoen and Carl Taussig on Dec. 2, 2003 describes an electrostatic actuator having electrodes on both the stator and rotor.

In summary, there are a large number of prior art devices that are currently using a twisting ball or cylinder geometry for either display technology or for reflection mode solar concentration. However, none of these teaches or anticipates the present invention of transmission mode solar tracking and transmission mode concentration. Additionally, there are a large number of prior art electrostatic actuation devices but most of these are based on electrodes on both the stator and the rotor; additional deficiencies of the prior art include complexity due to a need to suppress a bi-stable state that makes direction of motor displacement impossible to determine without a means to force a predetermined direction of motion. Thus the prior art described above is seen to have multiple deficiencies. These deficiencies are addressed and overcome in this patent.

DEFINITIONS

"Angle-Tracking" as used herein refers to the process of mapping the acceptance angle of a solar concentrator into the solid angle subtended by the sun. This type of tracking allows the receiver to remain fixed relative to the sun while still allowing high levels of concentration. The cosine roll-off of power still exists but the form of the receiver may now be integrated into structures such as building or satellites without the need for bulky and costly heliostats.

"Area-Tracking" as used herein refers to the process of keeping the area of an input aperture of a solar receiver directly in front of the sun. This minimizes the cosine roll-off of power due to geometry. It also required large mechanical structures to physically move in order to maintain the optimum geometric configuration.

"Collection" as used herein refers to the optical process of gathering solar energy into an optical system. It is separate and distinct from aggregation, concentration, distribution, and energy conversion processes.

"Concentration" as used herein refers to the optical process of increasing the flux, or flow, of light through a given area. In solar applications it is often given in terms of the number of suns of equivalent flux, where unity concentration or one sun of concentration is equivalent to 1000 Watts per square meter. It is separate and distinct from collection, aggregation, distribution, and energy conversion processes.

"Distribution" as used herein refers to the process of routing light, which is passing through a common input cross sectional area, and guiding it to a common output cross sectional area. It is separate and distinct from aggregation, collection, concentration, aggregation, distribution, and energy conversion processes.

"Electret" refers to a solid dielectric maintaining a persistent electric polarization independent of external polarization inducing electric fields. It is the direct electric field analog of a magnet, which is based on magnetic fields.

"Electrostatic Motor" refers to a type of motor that uses attraction and repulsion of electric charges. The dynamics of the charges involved are often only quasi-static and it typically requires high voltage at low currents. These motors can be made with either permanent electrets or by inducing charges by the application of voltages. The electrostatic motor is the duel of conventional magnetictostatic motors that require high current and low voltage.

"End Use Energy Product" as used herein refers to a the output of a solar energy conversion process. Examples include natural sunlight (trivial case with no energy conversion), electricity, and heat.

"Etendue" as used herein refers to a physical constant of an optical system which determines the relation of concentrated area and solid-angle extent as light propagates. It is mathematically the integrated 6-dimensional volume that a bundle of rays traverses in a momentum phase space. This is approximately the product of the solid-angle of light-cones, which are defined by the angular extent of light at a point, at a given physical or mathematical aperture times the area of the aperture. If a non-imaging optical system is incorrectly designed then it will have a different etendue as a function of position resulting in the rejection of any input light.

"Heliostat" refers to a clock-driven mechanical mounting for a solar collector. This mounting continuously and automatically tracks the sun by imposing physical motion over the entire solar collector structure.

"Light-Cone" as used here in refers to a bundle of rays filling a cone and having a common mathematical source point located at the apex of a cone. Such a bundle of rays can be defined at each point of an optical system and the solid-angle subtended by this cone is related to the cross sectional area of the optical system through the physical constant called the etendue. Concentrators must accept light of a specific solid-angle centered on a specific input direction as input if the concentrator is to perform its function of concentrating light. If the solid-angle of a cone of rays, or the direction about which a cone of rays is prescribed, is not optimally chosen than light will be rejected from the concentrator. The present patent manipulates the light cone geometry to allow concentration under a wide range of sunlight input conditions.

"Null Refraction" as used herein refers to a refraction process that does not change the direction of a light ray after the optical interaction but may induce a relative physical offset or translation of the ray of light. Such a process leaves the optical momentum unchanged.

"Optical Momentum" is the product of the magnitude of a single photon's intrinsic quantum momentum, the local refractive index, and the unit vector tangent to the path of the photon and corresponding to the direction of a ray.

"Pitch" as used herein refers to the distance between adjacent electrodes. This distance may be the same from electrode to electrode or it may be variable.

"Reflection Mode" as used herein refers to the optical process of using a twisting ball or cylinder with an embedded mirror to reflect incoming solar energy.

"Rotor" as used herein refers to the moving part of a motor, or that part which by convention is considered to be moving, without regard to the geometry of the moving part, i.e. it may be a twisting ball, a twisting cylinder, or a block of material moved in linear translation—which is sometimes called a slider. A rotor may also have useful optical properties.

"Slider" as used herein refers to the moving part of a linear motor, or that part which by convention is considered to be moving with linear or angular translation. This term shall sometimes be used when more specificity is needed than the general term: rotor. A slider may also have useful optical properties.

"Stator" as used herein refers to the stationary part of a motor, or that part which by convention is considered to be stationary. In the present invention it may be the electrodes that surround a twisting ball or twisting cylinder, which are called rotors. A stator in the present invention may also control the actuation of more than a single rotor in an array of rotors. A stator may also have useful optical properties.

"Stepping Motor" refers to a type of electric motor which is used when something has to be positioned very precisely or rotated by an exact angular or linear translation over small discrete steps.

"Suntenna" as used herein refers to a single optical element used for tracking the sun. It is the phase-incoherent analog of an antenna element used to make phase-coherent array antennas in coherent radiation systems.

"Suntenna Array" as used herein refers to an array of individual suntenna elements. This array may be periodic or non-periodic. It may be in one, two, or three dimensions. It may have a plurality of different suntenna device types.

"Transmission Mode" as used herein refers to the of using a twisting ball with two or more sections that allows light to flow through the balls by a process of surface or volume refraction.

"Twisting Ball" as used herein refers to a spherical ball created from one or more materials. The materials being chose to allow optical and control properties to be embedded within the structure. An integrated twisting ball is a type of suntenna.

"Twisting Cylinder" as used herein refers to a cylinder created from one or more materials. The materials being chose to allow optical and control properties to be embedded within the structure. An integrated twisting cylinder is a type of suntenna.

BRIEF SUMMARY OF THE INVENTION

There are multiple applications of the present invention, however, the primary application of this invention is solid-state solar tracking and concentration. The present invention describes a method for tracking the sunlight emitted from the sun and redirecting that light using solid-state electro-optics techniques for the purpose of optimally collecting and concentrating sunlight from a platform that is not intrinsically positioned for receiving the maximum solar flux from the sun. An example of such a platform is a building having a fixed roof and walls. The present invention can be directly integrated into a building, or other platform, to make it capable of optimal solar energy conversion even though the platform can not physically move to area-track the sun.

In particular, in the present invention a transparent rotor, having a flat optical boundary in its interior, which is positioned between two media having substantially different refractive indices, is embedded in a transparent stator having substantially matched refractive indices to that of the rotor so that sunlight traveling inside the combination of the optically transparent stator and optically transparent rotor only has substantial refraction at the rotor's internal optical boundary and predominantly null refraction at the interface of the rotor and stator. Thereby allowing almost all of the incident solar radiation to be redirected either to a common point for concentration or in a common direction for subsequent processing by other optical elements such as, but not limited to, a fixed light concentrator.

The optically transparent stator and the optically transparent rotor are separated by a small gap which may optionally be filled with a lubricating medium. This lubricating medium is typically chosen to have a refractive index between the refractive index of the stator and rotor. Furthermore, the gap is made very thin so that the refraction process at the curved interface region containing said gap between the rotor and stator is a almost a perfect null refraction process.

The optics principles described in the present invention are independent of physical scale as long as the scale is within the limits set by the geometric optics. The principles of actuating the optically transparent rotor is, however, scale, or size, dependent and various embodiments exist due to this scale dependence and also due to the large number of potential physical processes that allow actuation of the optically transparent rotor.

This invention shall predominantly focus on electrostatic forces to actuate the optically transparent rotor, however, other methods are clearly possible including acoustic waves, magnetic forces, bulk deformations due in hydrogels induced by light or electric inputs, micro-machines based on thermal agitation and ratchet-like structures, and fluid pressure to name just a few of the possibilities. In all the possible cases of actuation and scale the optics described here in remains essentially unchanged so long as the scale of the system is chosen so that interference by the wave nature of light does not become a predominant physical process.

The combination of an optically transparent rotor, an optically transparent stator, and a means to actuate said rotor relative to said stator is called a suntenna—in analogy to a radio frequency antenna. A plurality of individual suntenna are typically combined into arrays so that large areas can be covered to collect significant amounts of sunlight.

Accordingly several objects and advantages of the present invention are:
  (a) to provide a solid-state adaptive solar angle-tracking system based on transmission mode optics and the refraction of light;
  (b) to provide a means to electronically steer light by the orientation of one or more optically transparent spherical rotors using either surface or volume refraction internal to said transparent rotor as a means to change the direction of light;
  (c) to provide a means to electronically steer light by the orientation of one or more optically transparent cylindrical rotors using either surface or volume refraction internal to said transparent rotor as a means to change the direction of light;
  (d) to provide a fixed-position narrow acceptance angle concentrator that may be used in applications where the light source moves relative to the receiver without the need to physically move the concentrator to directly intercept the incident light over a narrow solid acceptance angle;
  (e) to provide a device that can redirect sunlight without concentrating it directly;
  (f) to provide a device that can redirect sunlight while also concentrating it directly;
  (g) to provide a substantially flat boundary between different refractive index media that tilts to any orientation based on the application of a suitable actuation force, such as but not limited to, electrostatic forces;
  (h) to provide a device that may be arrayed onto surfaces of deferent geometries for the purpose of integration into a structure such as a building or a satellite;
  (i) to provide a light angle-tracker that transforms an input light-cone from a specific spatial direction into another light-cone in another spatial directed associated with the optical axis of a non-imaging concentrator;
  (j) to provide a device that allows classical non-imaging concentrators to be used in a dynamic environment where they would normally require classical mechanical area-tracking to stay aligned with light source;
  (k) to provide a tilting refractive surface which is controlled with voltages;
  (l) to provide a tilting refractive surface which is controlled with light intensity;
  (m) to provide a device to automatically angle-track a source of light, such as the sun, by the use of a feed-back control system;
  (n) to provide a device to concentrate sunlight to one more photovoltic chips independent of the position of the Sun;

(o) to provide a device to concentrate sunlight into light guides, which are located after one or more suntenna;

(p) to provide a device to concentrate sunlight to either a photovoltaic chip or a light guide or both a photovoltaic chip and a light guide simultaneously;

(q) to provide a device to conform to a surface with a plurality of angle-trackers and a plurality of concentrators with corresponding photovoltaic cells or light guides of a combination of photovoltaic cells and light guides;

(r) to provide a means cover a large optical concentrator with one or more suntenna;

(s) to provide a device capable of high precision tracking so that high-intensity concentration may be achieved;

(t) to provide a device that is electronically steered by an electrostatic motor with little to no power loss;

(t) to provide a device that is electronically steered by a piezoelectric ultrasonic actuated motor with little to no power loss;

(u) to provide a device that can track the sun using consistent, reproducible, and precise digital techniques;

(v) to provide a device that can track the sun using analog techniques;

(w) to provide a device that can be used in reverse from that predominantly described in this document so that light energy generated at a particular position can be scanned to another position using the adaptive optics systems described herein.

Further objects and advantages will become apparent from a consideration of the ensuing description and drawing.

BRIEF DESCRIPTION OF DRAWINGS

The foregoing discussion and other objects, features, aspects, and advantages of the present invention will become apparent from the following detailed description of embodiments and drawings of physical principles given by way of illustration. Unless otherwise stated the figures are drawn for improved clarity of the underlying physical principles and are not to scale.

DETAILED DESCRIPTION

Figure 1:
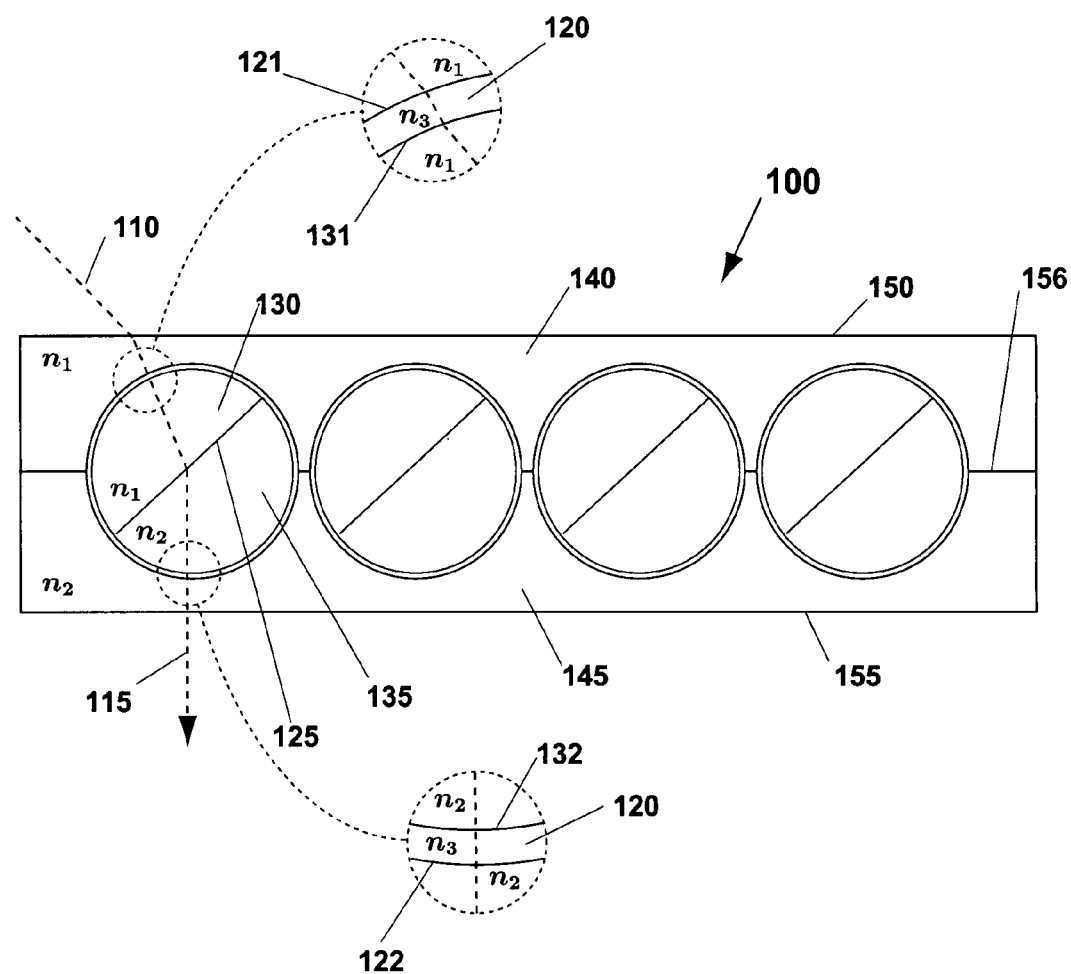
FIG. 1 shows in cross section the optical design for a transmission mode suntenna array without regard to the method for actuation of the transparent rotor.

FIG. 1 shows a small cross section of a larger array which is comprised of a plurality of suntenna elements. FIG. 1 specifically shows a section comprising four suntenna sun trackers 100. Light 110 from a remote source travels through air or vacuum and strikes a first surface 150 of a first member of an optically transparent stator 140. The first surface 150 of the first member of said stator 140 having optical coatings to suppress Fresnel reflections and to reject certain spectral components of the incident light as may be necessary. The first member of said transparent stator 140 has a volume refractive index $n_1$.

Light having passed through said first member of said transparent stator 140 then encounters a second surface 121 of the first member of said transparent stator 140. Said second surface 121 of the first member of said transparent stator 140 having optical coatings to suppress Fresnel reflections at an optional thin optically transparent fluidic lubricating layer 120 positioned between said second surface of the first member of the stator 121 and the first surface of a first member of a transparent rotor 131. The thin fluid lubricating layer 120 having refractive index $n_3$.

By means of propagation the light next encounters the first surface 131 of a first member 130 of an optically transparent rotor. Said first surface 131 of said first member of said transparent rotor 131 having optical coatings as needed to suppress Fresnel reflections.

By means of propagation the light next encounters a boundary 125 between said first member of said transparent rotor 130 having refractive index $n_1$ and a second member 135 of said transparent rotor having refractive index $n_2$. The boundary 125 optionally having optical coatings to suppress Fresnel reflections. The boundary 125 of the transparent rotor is where active steering of the light ray 110 occurs.

By means of propagation the light next encounters said thin fluidic lubricating layer 120 again but now said lubricating layer is positioned between a second surface 132 of said second member 135 of the rotor having refractive index $n_2$ and the first surface 122 of a second member 145 of said transparent stator having refractive index $n_2$. Again optional optical coatings are on the surfaces 132 and 122 to suppress Fresnel reflections from said lubricating layer having refractive index $n_3$.

Light passing through the lubricating layer 120 mostly undergoes a null refraction process whereby the optical momentum of the light is unchanged and where very small displacements of the light occur. The displacements of the light rays approaching zero as the thickness of the layer of lubricant 120 approaches zero.

Finally, by means of propagation the light encounters a second surface 155 of said second member of said transparent stator 145. Surface 155 having optional optical coatings as needed to suppress Fresnel reflections. The result is a ray of light 115 that is in a different direction than the input light 110.

Said first member of said transparent rotor 130 and said second member 135 of said transparent rotor being joined together permanently at the boundary 125 during the manufacturing process. Said first member of said transparent stator 140 and said second member of said stator 145 also being joined together permanently at the boundary 156 during the manufacturing process.

The rotor is able to move relative to the stator by any one of a number of physical processes, as will be described later in this invention. The result of which is that the sunlight incident on the suntenna array 100 is redirected to a subsequent stage of processing by using a transmission mode process. The ray of light from each rotor may either be concentrated directly to a smaller area by having each rotor at a slightly different angle, or the light or may be maintained in the same general direction by giving all the rotors configured in essentially the same orientation.

Figure 2:
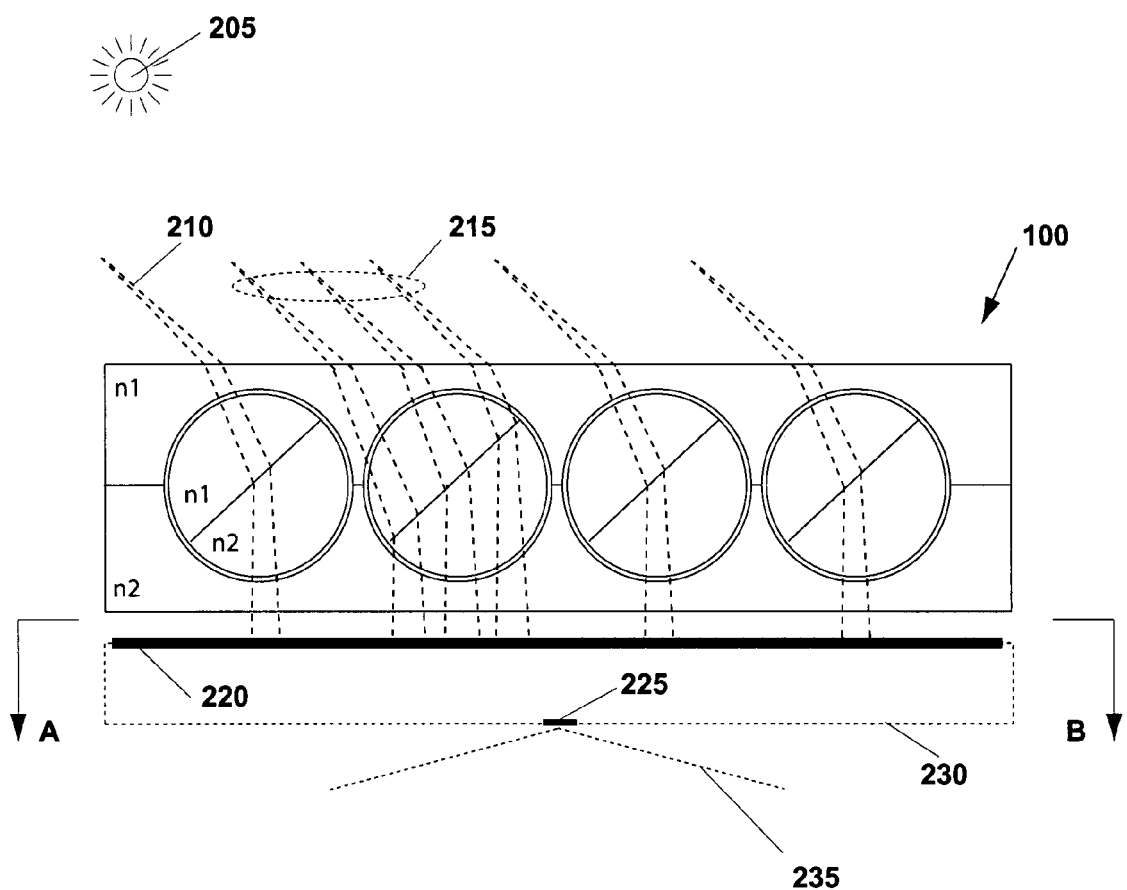
FIG. 2 shows in cross section the optical design for a transmission mode suntenna array evolving light-cones from the sun without regard to the method for actuation of the transparent rotor.

FIG. 2 shows the same embodiment 100 as FIG. 1, however, the solid angle of the light-cone 210 associated with the finite disk of the sun 205 is now accounted for in the cross sectional cut. A collection of the light-cones 215 clearly shows that even though said transparent rotor and said transparent stator have curved lens-like surfaces 121, 122, 131, and 132 the light is unaffected by said curved lens-like surfaces. Only the optical boundary 125 has any active and controllable effect on the flow of light energy.

Note that FIG. 2 schematically shows concentrating optical elements 230 below the demarcation line AB. The upper surface 220 is an input aperture and the lower surface 225 is the output surface for concentrated sunlight. Light 205 having a narrow solid-angle over the large area of the input surface 220 is transformed into light having a large sold angle 235 over a small concentrated area 225. This process is cannot be achieved if the alignment of said transparent rotors is not within a narrow range of values. To achieved this narrow range of orientations a high performance actuator is required to precisely rotate said transparent rotors. The remaining part of the invention addresses integration of a means for actuating said transparent rotor relative to said transparent stator.

Figure 3:
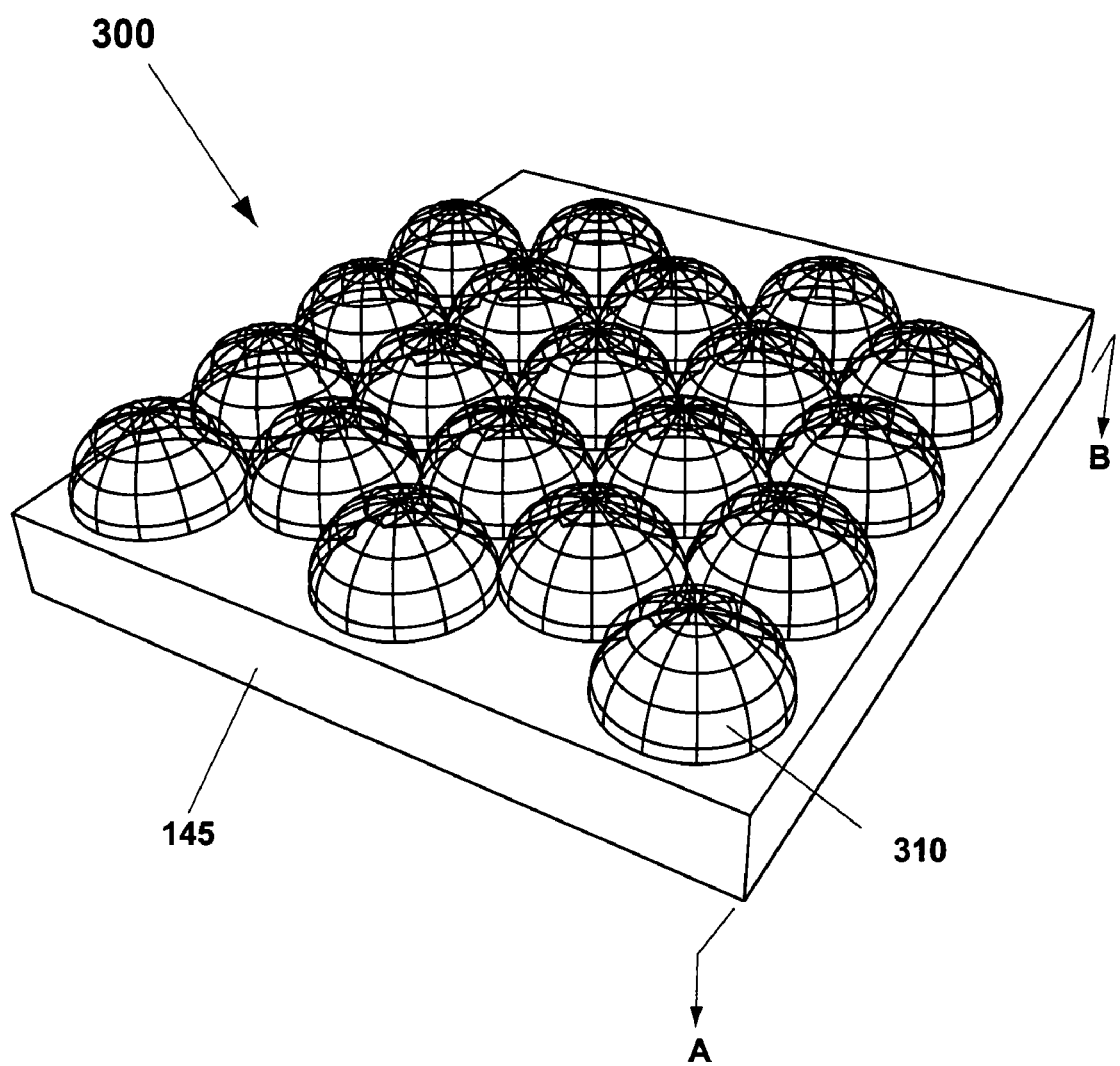
FIG. 3 shows in three dimensions an array transparent and spherical suntenna rotors.
Figure 4:
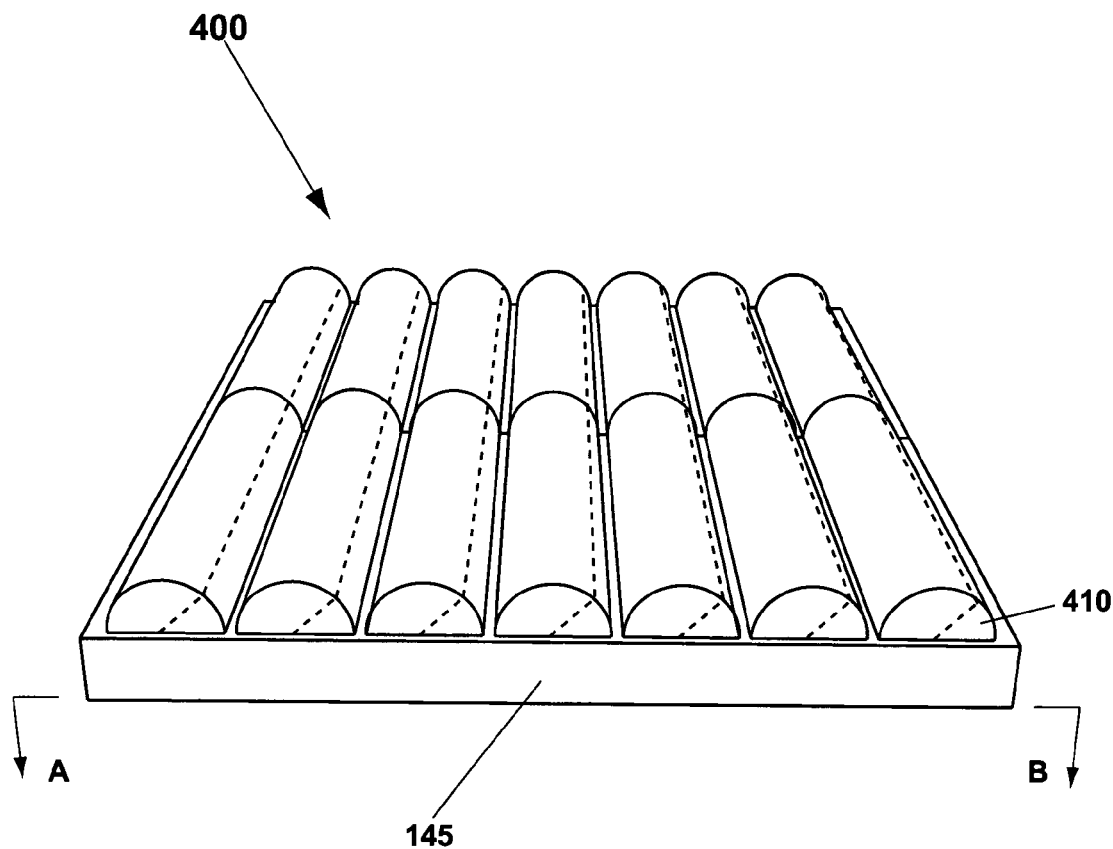
FIG. 4 shows in three dimensions an array transparent and cylindrical suntenna rotors.

FIG. 3 shows an embodiment of the suntenna array 300 comprising rotors made from spheres of dielectric 310. FIG. 4 shows an embodiment of the suntenna array 400 comprising rotors made from cylinders of dielectric 410.

FIGS. 5, 6, and 7 relate to prior art of U.S. Pat. No. 5,585, 683 and are included to teach the deficiencies of the prior art in detail as well as to illuminate the improvements that are made in the current invention. Although the present invention is mostly concerned with a spherical or cylindrical transparent rotor it will prove instructive to limit our discussion to the case of linear actuators first in order to simplify the presentation and to focus in on the defining characteristics electrostatic actuation. Later we will take what is illustrated and present it in a form suitable for spherical and cylindrical rotors.

There are two key limitations of the prior art. First, the need for more than two phases of drive voltage creates a need for multi-layer routing of electrical signals. For a single actuator this is not too high a cost, however, in a solar array where a million actuators might be arrayed in a single system this amounts to a million times the cost and complexity difference between a system that needs a third phase a system that does not need a third phase. Second, there is a need for ultra-high precision in the actuation of the rotors. These issues are not addressed significantly in the prior art.

Figure 5A:
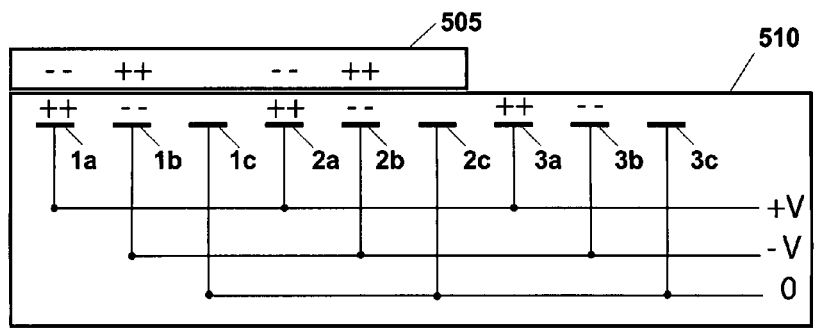
FIGS. 5A-5D shows prior art of the required electrodes and voltages needed for moving a slider relative to a stator in a time sequence of steps.

In particular, FIG. 5A shows a slider 505 having bulk resistivity of $10^9$ $\Omega\cdot$cm to $10^{11}$ $\Omega\cdot$cm or equivalently $10^{13}$ $\Omega$/square to $10^{15}$ $\Omega$/square. For the sake of comparison common glass has a bulk resistivity between $10^{12}$ $\Omega\cdot$cm to $10^{16}$ $\Omega\cdot$cm, quartz has a bulk resistivity of about $10^{20}$ $\Omega\cdot$cm, and pure teflon has a bulk resistivity of between $10^{24}$ $\Omega\cdot$cm to $10^{26}$ $\Omega\cdot$cm. Thus the slider 505 is very slightly conductive relative to pure glass—although there is some overlap. Furthermore, a set of voltages {−V, 0, +V} is applied to electrodes 1a, 1b, 1c, 2a, 2b, 2c, 3a, 3b, and 3e; which are located in the stator 510. This electrodes are organized into periodic sets called voltage phases. We will call these phases a, b, and C corresponding to what is shown in FIG. 5 for the names of the electrodes.

In the steady state condition of FIG. 5A each phase of the electrodes in the stator is assigned the voltage shown and a complementary charge distribution has been induced in the slider. Part of this induced charge distribution is due to polarization of the dielectric resulting in bound volume charges and bound surface charges in the slider 505; part of the induced charge is due to free charges induced due to the slight conductivity of the material. We are most concerned with the free charges because the bound charges respond almost instantaneously to voltage changes on the electrodes while the free charges respond with a time constant that is dependent on the resistivity and capacitance of the system and this will provide a means for inducing forces on the slider 505. The free charges are indicated in these figures using the symbols + and −. The sign of the induced charges in the slider 505 is opposite to that of the corresponding electrode in the stator 510 and the slider is strongly attracted to the stator. Frictional forces are thus at a maximum and the slider 505 in the electrostatic stepping motor is locked in place.

Figure 5B:
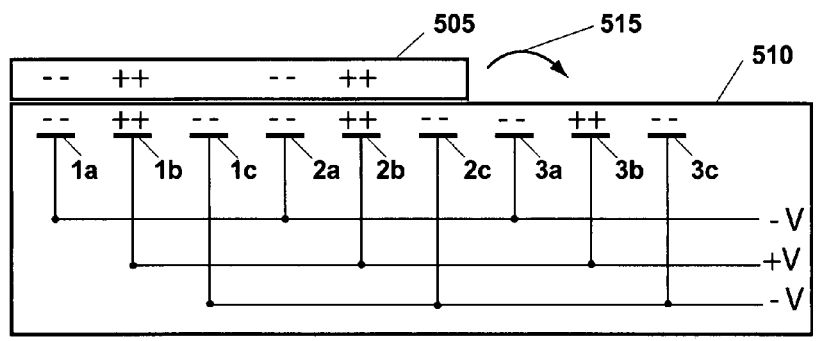

In FIG. 5B we see the situation just after an adjustment of electrode voltages as indicated. Three things have occurred: first the a and b phases have reversed polarity in the stator 510, second the accumulated charges in the slider 505 have started to respond to the stator electrode voltage changes but because of the relatively high resistivity the charges are taking a long time to respond and they have not appreciably changed from the steady-state condition, and three the c phase electrodes have changed to a polarity that dictates which direction the slider will move. In the case shown the c phase electrodes have take a negative charge and this will tug at the positive charges in the slider causing unbalanced tangential forces to exist on the slider 505 to the right. Had the c phase electrodes been reversed in polarity the unbalanced tangential force would have been to the left. Furthermore, the normal force on the slider is now directed away from the surface of the stator, thereby reducing friction and allowing the slider to step 515 in the direction set by the phase c electrodes. Note that the value of the voltages are typically in the range of 1000 volts, depending on the geometry involved.

Figure 5C:
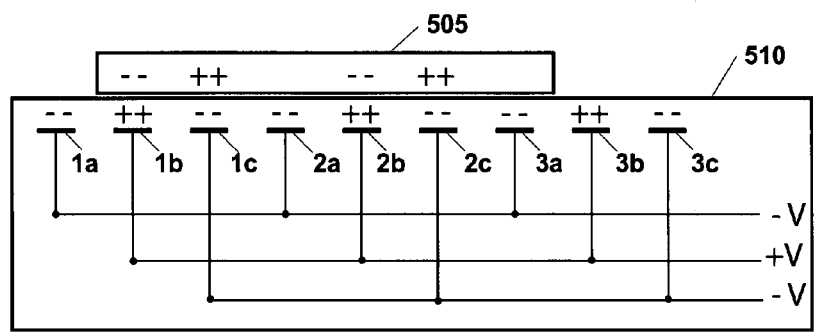

In FIG. 5C the slider's induced charged have still not changed very much from the steady state, even after the stepping motion 515 has occurred, due to the relatively large resistive properties of the material used to make the slider and the resulting resistive-capacitive time constant associated with the slider.

Figure 5D:
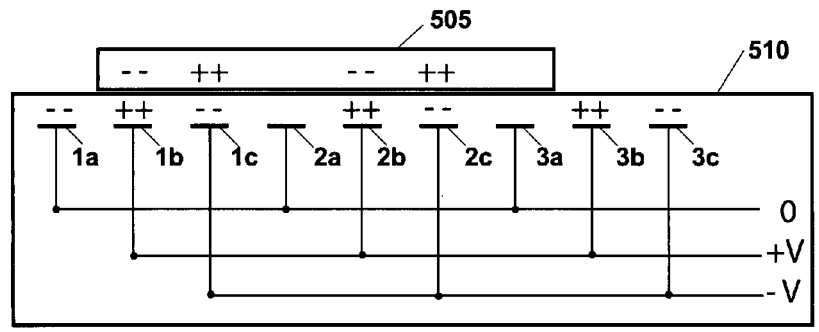

Finally, in FIG. 5D the phase a electrodes are grounded in preparation for the next cycle of voltage transitions and the next step of the stepping motor. As can be seen each phase gets a chance to specify the direction of travel for the slider; the functions of each phase permutates cyclicly every three steps. The main point to be take from this analysis is that each phase provides two services: either changing the normal forced from attractive to repulsive or selecting the direction of travel by inducing a perturbation tugging force to the left or to the right on the slider, depending on the desired direction of travel. Also, carefully note that the pattern of induced charges has not changed at all in the slider during the execution of the stepping process. This means that there is little ohmic loss in the slider this configuration. Unfortunately, there are also three phases that need to be physically wired to make the system work. Additionally, the full area of the slider is not charged so that this prior art has built in inefficiencies.

Figure 6A:
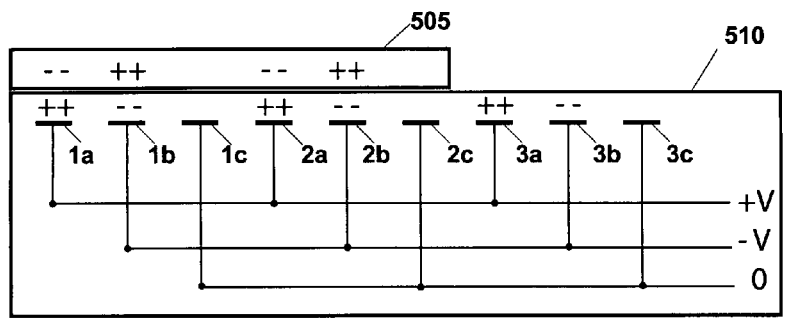
FIGS. 6A-6D shows additional prior art of the required electrodes and voltages needed for moving a slider relative to a stator in a time sequence of steps.
Figure 6B:
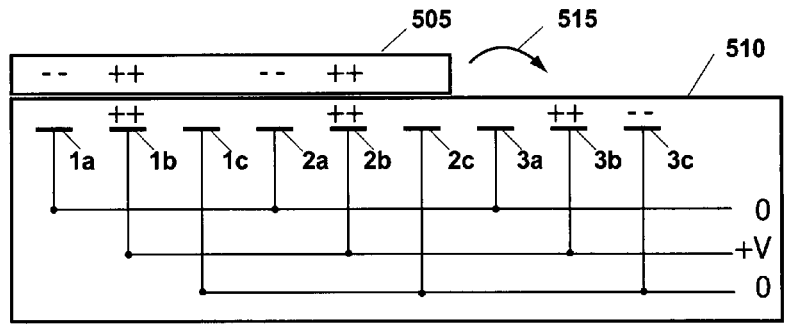
Figure 6C:
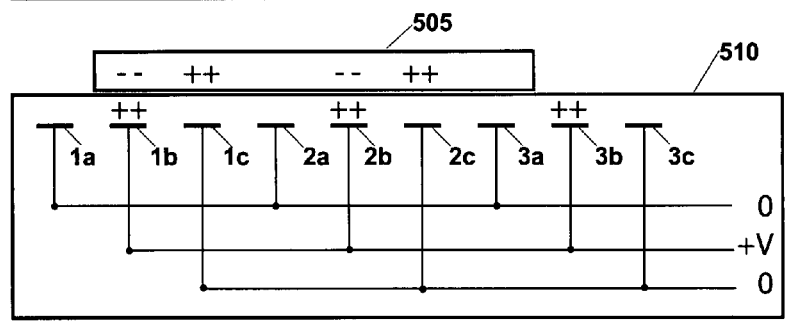
Figure 6D:
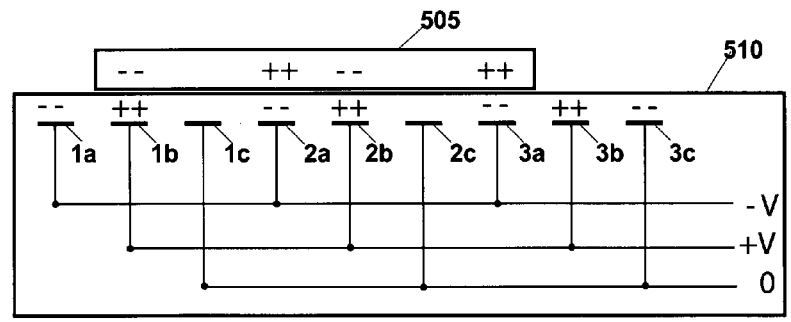

FIGS. 6A to 6D shows exactly the same physical setup used in FIG. 5A to 5D except that the voltage sequence is now different. In particular, the phase c voltages are always set to zero. A similar analysis as before shows how the stepping motor steps. In this case the c phase can be removed, thereby indicating that the problem of having too many phases to wire up is no longer a problem. However, there is in fact another significant problem that has been introduced as a consequence of changing the voltage pattern: the pattern of the induced charges in the slider 505 in FIG. 6D is now different from the pattern of charges in the slider in FIG. 6A. This can only happen if there are ohmic losses. In the case of an array of thousands to millions of suntenna elements actuated by such a system there would be significant loss due to the large numbers of actuators involved.

The prior art clearly has the correct property of low loss when the three phases are used but then the complexity of the drive system is too high for practical use in a large array of optical devices where multiple layers of interdigitated electrodes would be costly to implement. Alternately, the prior art has the ability to remove one of the phases but only at the expense of significantly increasing the losses as well as not using one all of the electrode area and thereby diminishing the holding forces induced on the slider.

Figure 7A:
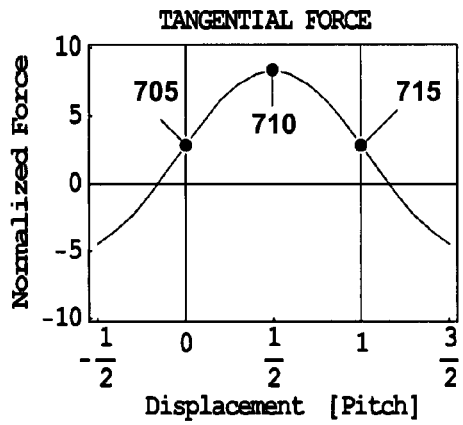
FIGS. 7A-7D shows an analysis of the forces on the electrodes of the prior art describes in FIGS. 5A-5D and FIGS. 6A-6D.
Figure 7B:
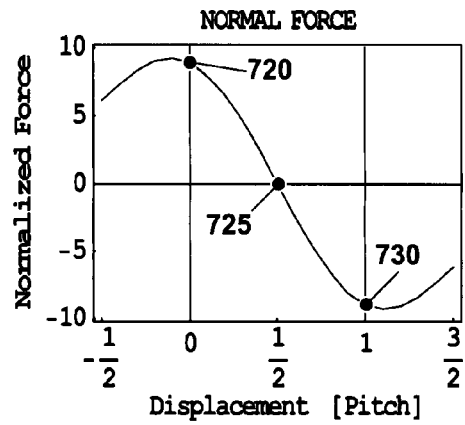
Figure 7C:
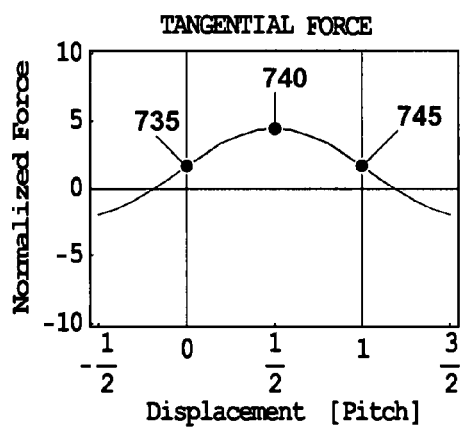
Figure 7D:
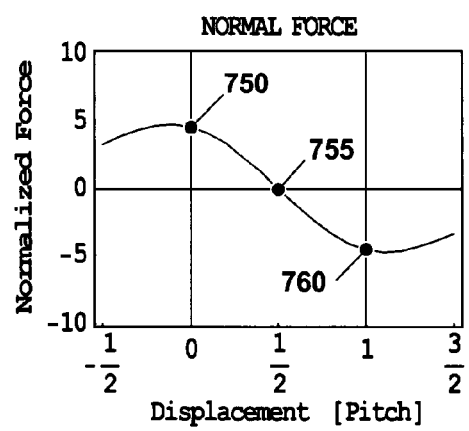

Furthermore, a quantitative analysis highlights another significant problem of the prior art. Consider FIGS. 7A and 7B, the calculated normalized tangential and normal forces on the slider 505 as a function of the position of the slider 505 relative to the stator 510, in units of pitch of length, is shown. This analysis corresponds to FIGS. 5A to 5D. Points 705 and 720 shows that the tangential and normal forces are positive just after the application of the voltages in FIG. 5B. Therefore the slider is lifted off of the stator and begins to move to the right. The tangential forces reach a maximum at point 710 and the normal forces diminish to zero at 725, which is halfway between the first electrode and the second electrode. Then the tangential forces on the slider 505 diminish until at a displacement of one unit of pitch there is still an unbalanced tangential force at point 715. The normal forces also reverse sign and the slider is now almost (but not quite) maximally attracted to the stator at one pitch unit of travel at the point 730. The unbalanced tangential force 715 will allow the stepping motor to overshoot the one pitch of desired travel distance. While this is not so much of a problem in the case of a slider it does become more problematic in the case of a rotor where symmetric electrodes always cancel the normal force. Therefore, there is no large scale frictional force to oppose motion and the tangential forces will significantly overshoot the one pitch of desired travel. FIGS. 7C and 7D with the points 735, 740, 745, 750, 755, and 760 show essentially the same problem with the design of FIGS. 6A to 6D. This issue of overshoot poses difficulties for solar tracking applications where high precision is required for high levels of concentration, especially for rotors having symmetrically placed electrodes.

Clearly, what is needed is a way to achieve low power dissipation, high thrust in the needed direction over a very well defined spatial extent, low complexity, and extreme accuracy all at the same time. This is achieved in the embodiments of an electrostatic stepping motor, integrated into a sun tracking optical system, as shown in this invention, the principles of which are initially described in FIGS. 8A to 8D and FIGS. 9A to 9B. Later the principle of operation for a solar tracking system will be discussed in terms of a rotor instead of a slider.

In the present invention we completely remove one of the phases of electrodes associated with said prior art and also completely use all of the available slider (or rotor) surface area for inducing charges upon. Hence, the stator 810; having electrodes 4a, 4b, 5a, 5b, 6a, 6B, 7a, 7b, and 8a; only has the two phases designated as a and b. This fundamentally changes the prior art because there is now no longer a control means to move the stator relative to slider as claimed therein. This control means was previously embodied in the form of a series of an interdigitated electrodes of three or more phases or effectively three phases by a particular coding of the electrode voltages, as shown in FIG. 6A to 6D. That is, in some of the prior art this perturbation force 815 is induced by a third phase of interdigitated electrodes (even if those electrodes are held at ground potential), which has the problem of inducing complexity of the wiring of the electrode network. In the present invention we seek to make large numbers of transparent rotors in an array for gathering light so that wiring complexity is of great concern.

The slider or rotor in the present invention also has a bulk resistivity of $10^9$ $\Omega$cm to $10^{11}$ $\Omega$·cm thereby allowing the resistive-capacitive time constant of said slider 805 to be set to at least twice the period of a stepping cycle. In the preferred embodiment the slider's (and in our later discussion the rotor's) intrinsic resistive-capacitive time constant is at least 100 times the desired stepping duration so that the free-charge distribution of the slider 805 remains essentially undisturbed during all voltage switching operations and the power dissipated in the slider is very small, and in fact essentially zero. In the steady-state or quasi steady-state condition the slider 805 has a periodic distribution of charges that remains throughout all operations.

Figure 8A:
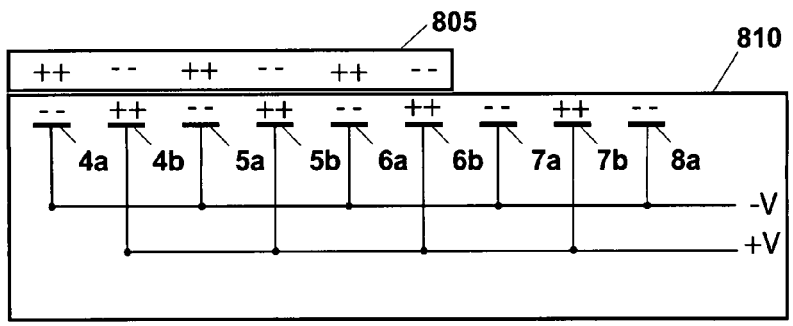
FIGS. 8A-8D teach a new method for applying voltages to electrodes and external perturbation forces for moving a slider relative to a stator in a time sequence of steps.
Figure 8B:
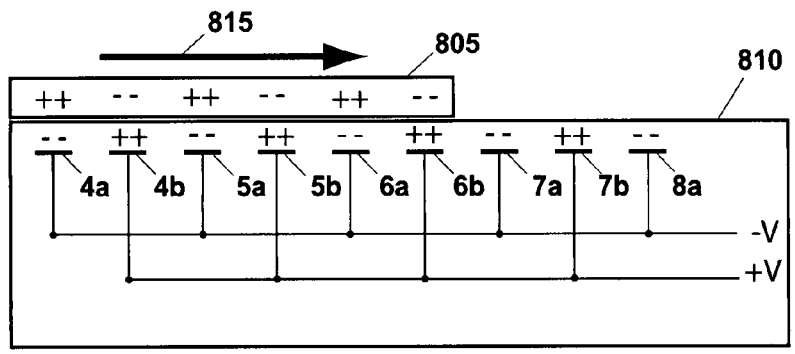
Figure 8C:
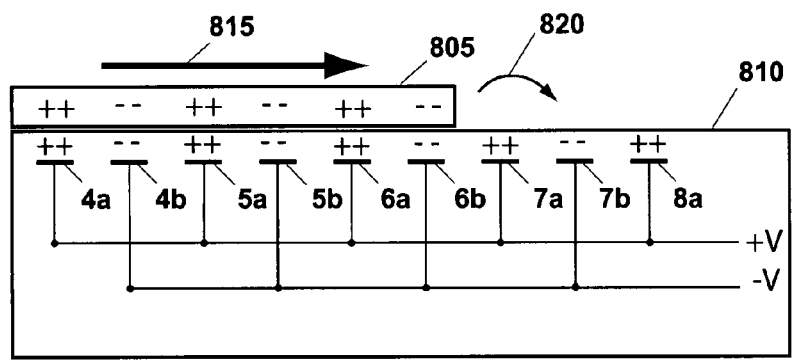
Figure 8D:
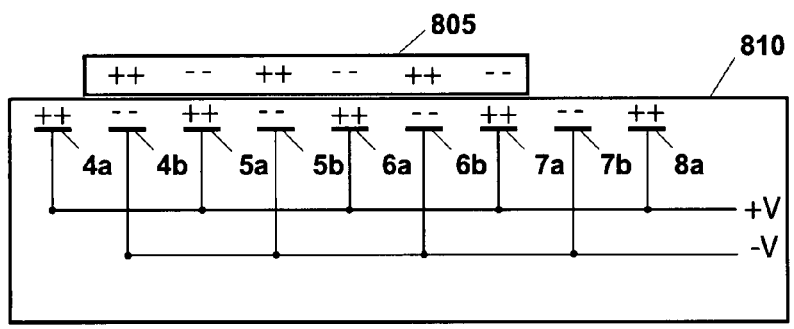

FIG. 8B shows the situation just after all the electrodes reverse polarity. If a tangential perturbation force 815 on the slider 805 is provided by an external means, just before said reversal of polarity, then the direction of motion of said slider is fixed by said tangential perturbation force. To appreciate this note that FIGS. 9A and 9B show the situation without the external tangential perturbation force 815 and FIGS. 9C and 9D show what happens with the external tangential perturbation force 815.

In the case without the tangential perturbation 815 there is a bi-stable state indicated by the zero tangential force condition 905 and the high thrust on the slider 805 away from the stator 810 as indicated by 920. Any vibration or force perturbation whatsoever will dictate the ultimate direction of motion of the slider. The perturbation can be very small. For example, a slight vibration in the negative tangent direction (to the left in FIG. 8B) will cause motion in the negative direction as a positive feedback effect reinforces the motion continuously away from the bi-stable point 905. Alternately, any positively directed tangential perturbation, such as that indicated by 815, will cause positively directed motion of slider and a step motion 820. This corresponds to a change of state from points 905 and 920 to the intermediate states indicated by 910 and 925 and then finally to states 915 and 930. The scales of the plots in FIGS. 7A to 7D is the same as for FIGS. 9A to 9D clearly indicating that the present invention has as good or better tangential thrust then the prior art, as good or better normal forces to lift the slider 805 away from the frictional surface of the stator 810, and furthermore that both the tangential and normal forces on the slider are ideal for a stepped displacement of only one pitch unit. That is, the tangential force 915 is zero and the normal force 930 is maximally attractive thereby inducing the greatest possible frictional stopping force possible. These are important properties for precision actuator because high precision alignment of optics is needed for solar tracking systems that use concentration in the steps following tracking.

Figure 9A:
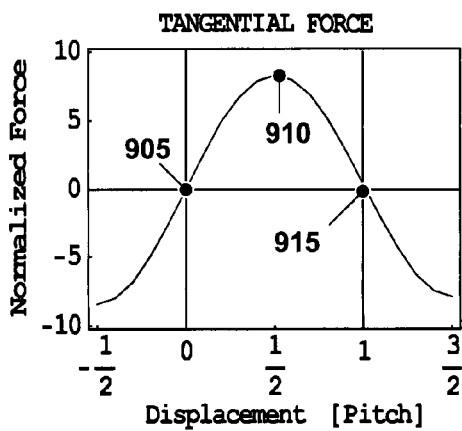
FIGS. 9A-9D shows an analysis of the forces on the electrodes of the method described in FIGS. 8A-8D.
Figure 9B:
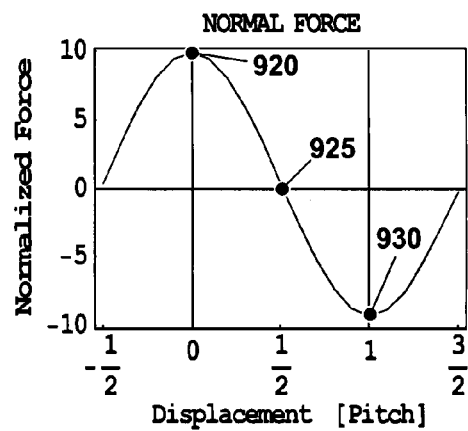
Figure 9C:
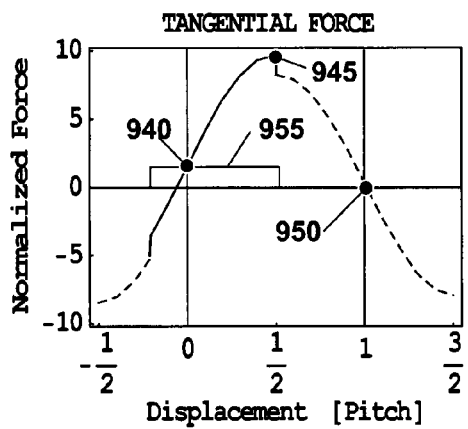
Figure 9D:
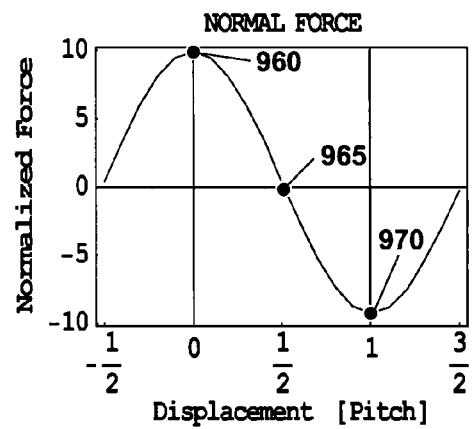

Clearly FIGS. 9A and 9B are almost ideal stepping motor characteristics except for a lack of an external perturbation force 815 to set a slider 805 in the desired direction, which in FIG. 8B is in the positive tangential direction as indicated by the desired perturbation force 815 on the slider 805. An idealized external tangential force 815 is indicated by the additive force 955 as is indicated in FIG. 9C. Said externally induced tangential force 815 is turned on just before the reversal of the polarity of the a and a phases and it is turned off just after the slider starts moving in the desired direction. This causes the initial tangential force to be at point 940 instead of point 905. The normal forces 960, 965, and 970 remain identical to the normal forces 920, 925, and 930 respectively. Due to the alternating pattern of positive and negative voltages on the electrodes with phases a and b over all the stator area in FIGS. 8A to 8D there is substantial tangential forces at the beginning 940 and mid-range of motion point 945 while the tangential forces 950 go to zero at the end of one step of travel.

There are numerous ways to develop a perturbation force 815. Examples include, but are not limited to, piezoelectric surface acoustic waves, magnetic forces, or even the mechanical expansion of hydrogel or bimetallic materials. In the preferred embodiment of this invention the use of a global electric field is used—in contradistinction to a local electric field used in the prior art. This global field is made by a small number of externally located electrodes that are not part of the alternating electrode set. This is one of the distinguishing features of the present invention that is significantly different from U.S. Pat. No. 5,585,683—note that the claims of the prior art patent require that the control means for moving the slider/rotor relative to the stator is part of the belt-like electrodes, which this invention clearly removes. Additionally, because it is only a perturbation tangential force and not the main tangential force it is also significantly different than U.S. Pat. No. 6,957,849 (and its derivatives and children), which require relatively large external electric fields to induce the primary tangential forces instead of just a perturbation force.

Furthermore, the power requirements of the perturbation fields can be made small because the required amplitude to motive the bi-stable state 905 is small. The power is proportional to the square of the voltage and the first power of the switching frequency. In solar applicants, events happen very slowly (Sub hertz) and the perturbation is necessarily very small.

Figure 10A:
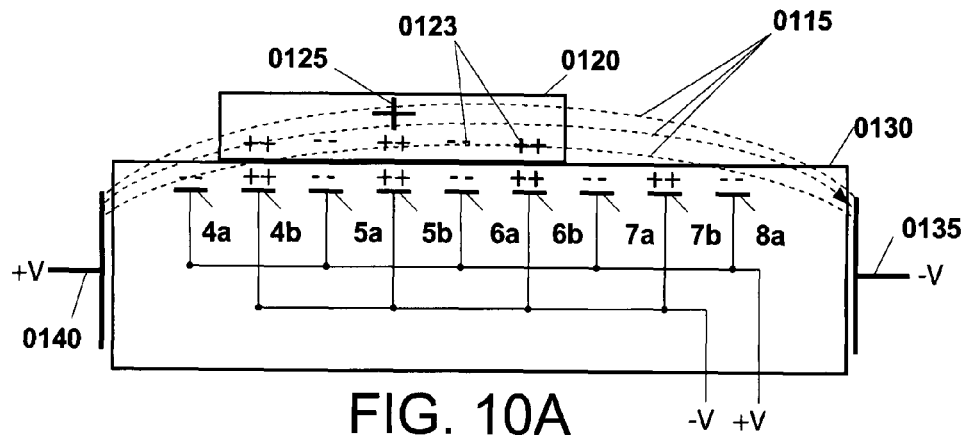
FIG. 10A-10C are instructional images showing a electret slider capable of being moved by the application of electric fields induced by several representative electrode configurations.

FIG. 10A shows a stator 0130 having electrodes 4a, 4b, 5a, 5b, 6a, 6B, 7a, 7b, and 8a; which are used to establish an alternating pattern of unbound charges, such as are exemplified by 0123, of opposite polarity in the slider 0120. The voltages on electrodes 4a, 4b, 5a, 5b, 6a, 6B, 7a, 7b, and 8a have been reversed to establish an unstable state so that any slight perturbation can affect the direction of the subsequent stepping action.

The unbound charges 0123 in the slider 120 are not able to move with great speed to disperse due to the repulsive nature of similar charges on the stator electrodes due to the resistive nature of the edges of the slider. This resistive nature is based upon using the proper material is the fabrication of said slider, as has already been described. The resistive-capacitive time constant associated with the unbound charges 0123 is large thereby allowing strong interactions with the stator 0130 fields. In contradistinction, a bound charge 0125 forming a mono-pole electret is also shown. It is made part of the body of the slider. The bound charge 0125 of the electret slider may be either positive or negative, it is only shown here as positive for illustration purposes. Additionally, the electret may also be of the bi-polar type, whereby bound charges of both polarities are available and configured to allow for one of the poles to predominantly interact with the fields of the stator to provide a perturbation force on said slider. Different geometries for the bound charges are also possible, such as but not limited to the use of quadruple configurations. Two stator electrodes 0140 and 0135 are shown having a voltage difference applied to them to provide a perturbation force to the right in FIG. 10A. The force is induced in the electret slider 0120 by the fringing fields 0115. A reversal of the voltages shown would result in a perturbation force to the left instead.

Note, for example, that the induced and unbound charges, such as 0123, do not contribute to the overall perturbation force because the alternating pattern of polarities of the charges have a net zero resultant force after interacting with the fields 0115. Only the electret charge 0125 provides a net force on the slider 0120.

Figure 10B:
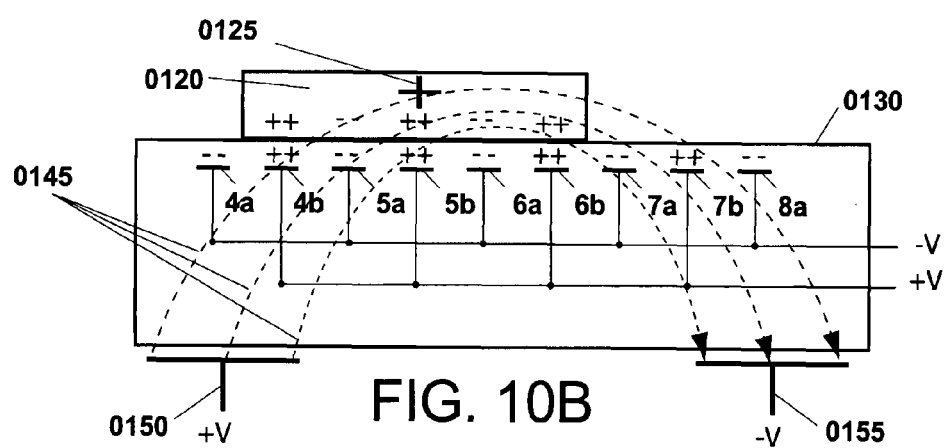
Figure 10C:
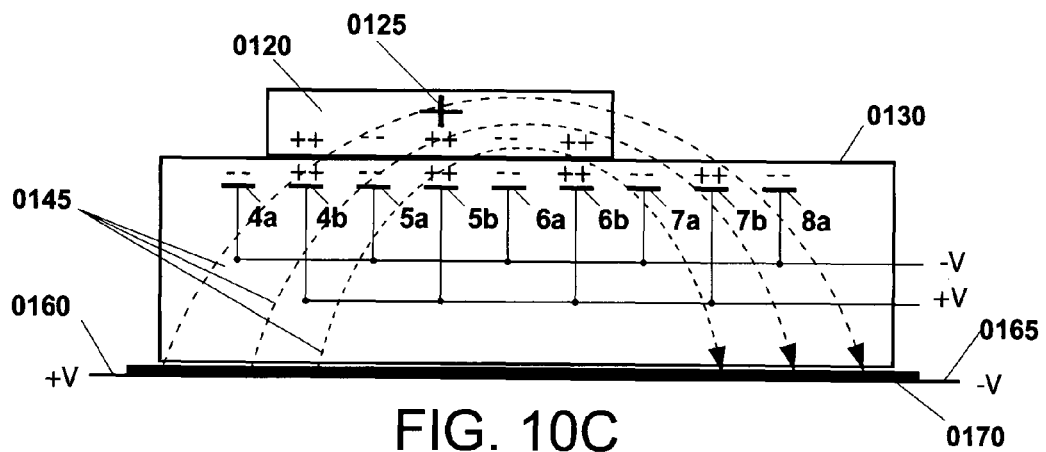

FIG. 10B shows the same configuration as just described except that there is a different configuration of perturbation electrodes 0150 and 0155. FIG. 10C again shows the same configuration as just described except that the discrete electrodes 0140, 0135, 0150, and 0155 have been replaced by one continuous and resistive electrode 0170. The resistivity providing a means to continuously step down the voltage from high to low. Again the polarity of the driving voltages at the edges 0160 and 0165 determine the direction of the induced tangential force on the slider.

Figure 11:
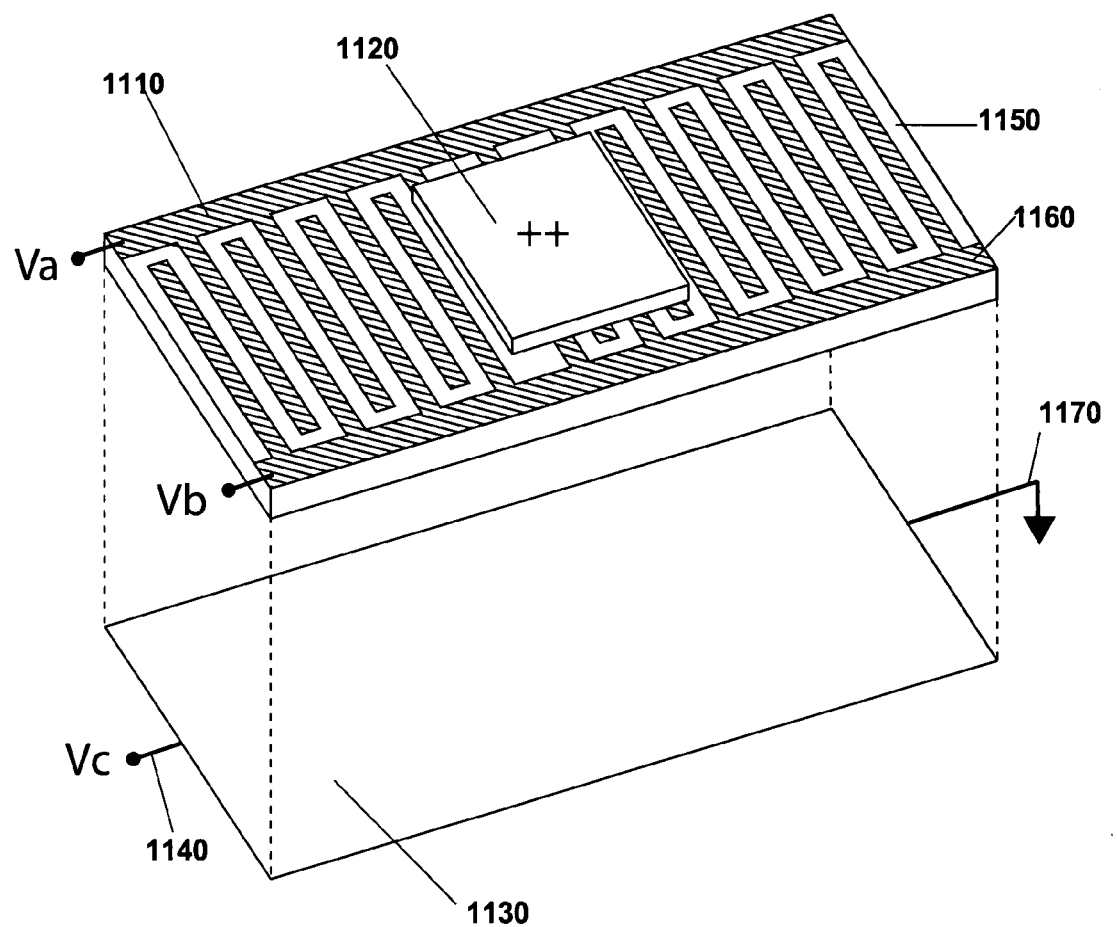
FIG. 11 is an instructional image showing in perspective how the bi-stable two phase electrostatic motor using an electret slider can be induced to have a particular direction of motion by using a single resistive electrode.

FIG. 11 is another instructional image and it shows an exploded perspective view of an electret slider 1120 on a stator 1150. The stator is composed of two interdigitated electrode sets, 1110 and 1160, for the purpose of providing an unstable force on the slider 1120. These electrodes provide the voltages $V_a$ and $V_b$ respectively. Additionally, the perturbation electrode is 1130 is shown as being the resistive type with a grounded side 1170 and a drive side 1140, which may take either positive of negative voltages to induce the proper perturbation forces on the slider 1150.

The examples just cited in FIGS. 8, 10, and 11 have been of an instructional nature. Next, we will show the preferred embodiment of the present invention, including the integrated optical components.

Figure 12:
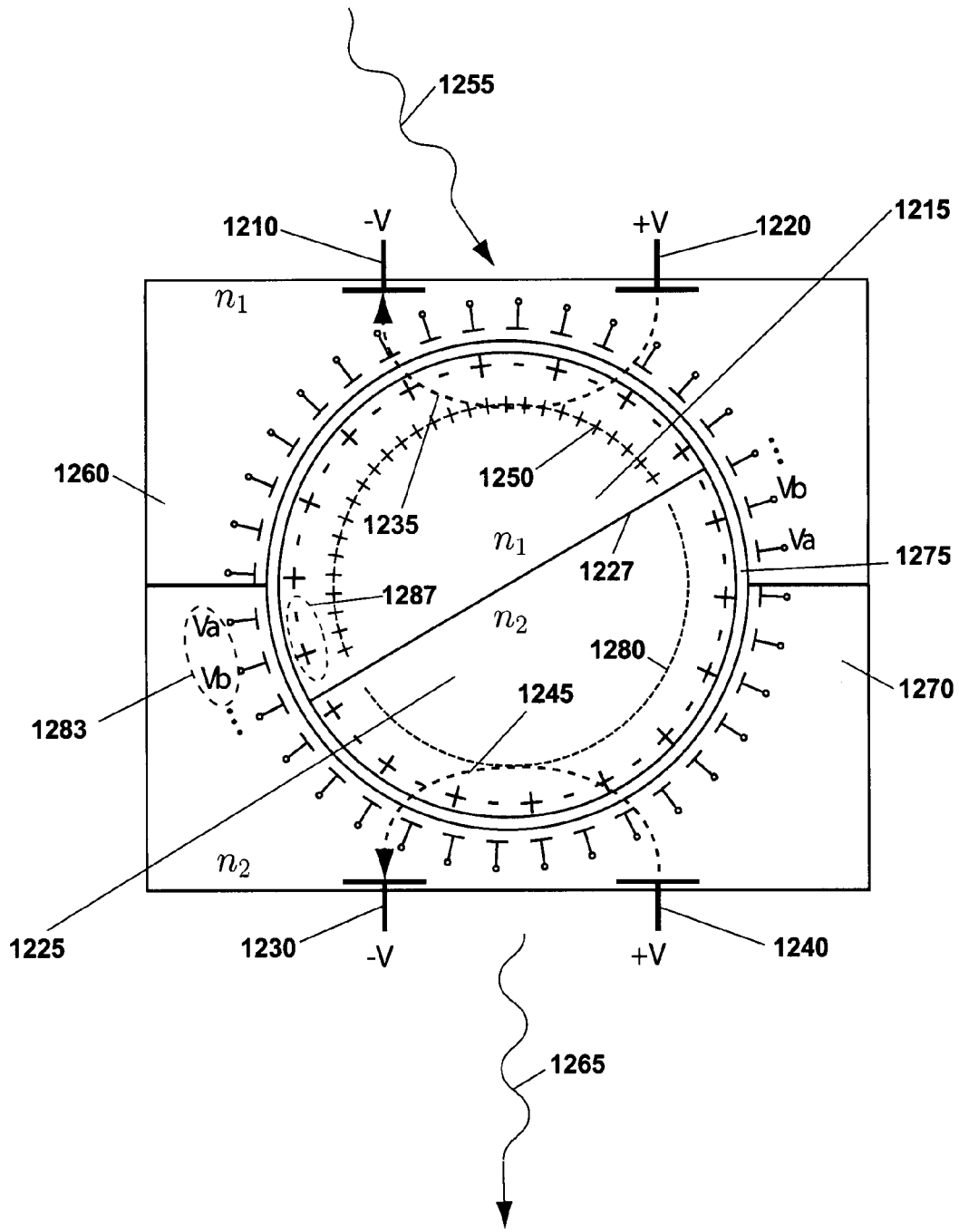
FIG. 12 shows in cross section the operation of a sun tracker based upon a transparent rotor and stator that have bi-polar charge distributions and voltage induced force perturbations to determine the direction of rotor rotation.

FIG. 12 shows a cross sectional view of an optically transparent rotor and stator used to track the sun and redirect sunlight actively. The rotor having a first transparent electret member 1215 with refractive index $n_1$ and having bound charges 1250; a second transparent electret member 1225 with refractive index $n_2$ and having bound charges 1280. Said first and second members of the rotor being permanently attached at an optical boundary 1227. Said optical boundary optionally having an optical coating to reduce Fresnel losses between the first transparent rotor member 1215 and the second transparent rotor member 1225. The rotor being placed inside of a stator comprising a first transparent member 1260 having refractive index $n_1$ and a second transparent member 1270 having a refractive index $n_2$. A space 1275 between the rotor and the stator optionally having a transparent lubricant with refractive index $n_3$. All surfaces of the stator and the rotor optionally being coated with thin optical films to control reflections and to limit unwanted spectral components of the input sunlight 1255 from being redirected to the output light 1265.

Transparent electrodes 1210 and 1220, mounted on or near to the first surface of the first member of the stator 1260. Transparent electrodes 1230 and 1240, mounted on or near to the second surface of the second member of the stator 1270. Said transparent electrodes providing electric fields 1235 and 1245 respectively, in order to create a perturbation torque to rotate said transparent rotor relative to said transparent stator in a desired direction for the purpose of tracking the sun by reorienting the boundary 1227. The optical boundary 1227 being aligned so that input light 1255 is redirected to the desired output light direction 1265 by way of a transmission mode process based on Snell's Law of refraction. Said transparent stator providing a periodic two-phase voltage variation indicated schematically by repetitions of the truncated section of the electrodes 1283. Said truncated section of electrodes inducing a periodic variation of free (unbound) charges as indicated schematically by the short section of free charges 1287.

Figure 13:
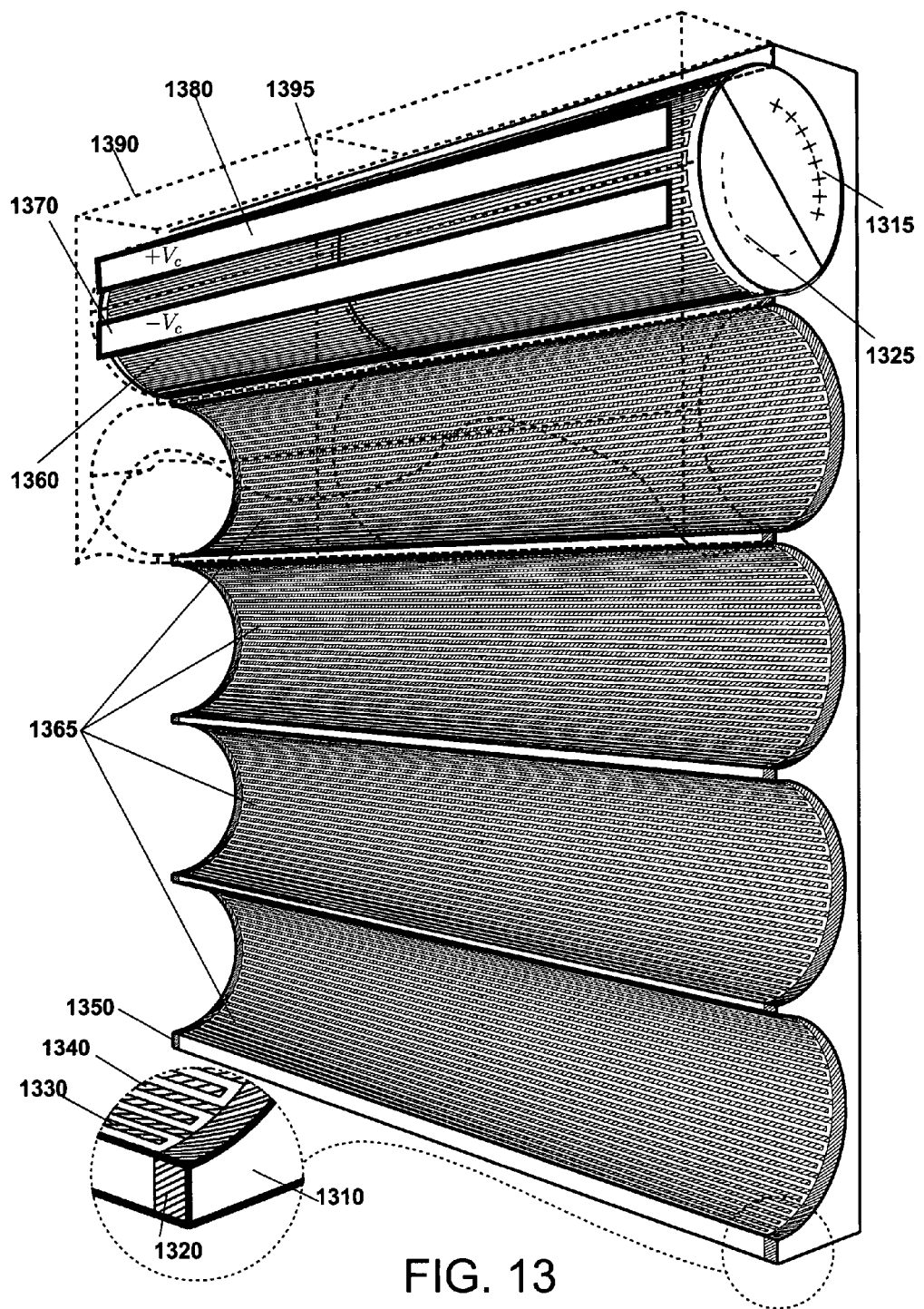
FIG. 13 shows in perspective the operation of a cylindrical sun tracker array based upon a transparent rotor and stator that have bi-polar charge distributions and voltage induced force perturbations to impress the direction of rotor rotation.

FIG. 13 Shows a perspective cut-away view of a five element section of a cylindrical suntenna array. Only one of the transparent rotors is shown for clarity. This figure is based on the embodiment of the device described in cross section in FIG. 12 and FIG. 17 as an alternative embodiment as will be discussed later. The first member of a transparent stator is shown in dashed outline and also as a cutaway structure to allow visual inspection of the inner working of the array.

Sunlight enters a transparent stator having a first member 1390. Said sunlight first passes through a first surface 1395 of the first member of a transparent stator 1390 or through the transparent electrodes 1370 and 1380, which are positioned on or near the first surface 1395 of the first member of said transparent stator 1390 and which provide a perturbation torque on a transparent rotor to drive said rotor in a desired direction for the purpose of redirecting sunlight by a refractive process at the interface between the transparent halves 1315 and 1325. Each halve having a significantly different refractive index and an electret charge distribution. Additionally, the first member of the stator 1390 having a matched refractive index to the first member of the transparent rotor 1325. The second member of the stator 1310 having a matched refractive index to the second member of the transparent rotor 1315 in order to allow sunlight to traverse the combination of said transparent stator and said transparent rotor undeviate, except for the boundary between said first transparent member of the rotor 1325 and said second transparent member of rotor. By a matched refractive index it is implied that the refractive indices are equal to close to equal in value.

Note that only one set of perturbation electrodes, 1370 and 1380, are shown in FIG. 13 to assist the reader in seeing through the structure. Furthermore, there are a mirror set of electrodes on the second surface of the second member 1310 of the stator that are not visible in the perspective view but are similar to the electrodes 1230 and 1240 is FIG. 12. The transparent perturbation electrodes and the interdigitated electrodes 1365, on the two members of the stator allow sunlight to penetrate through the entire combination of transparent stator and transparent rotor.

A transparent electret rotor having a first member 1325 and a second member 1315. The first and second half of said transparent rotor each having a bound charge. The bound charges may take an predetermined pattern, such as a quadrapole or may be all be of the same polarity or may be of opposite polarity. In the preferred embodiment each half of the transparent rotor have opposite polarity in order to maintain overall charge neutrality. The first member of the stator 1390 having a series of interdigitated electrodes 1360 at or near a second or inner surface, which is adjacent to the first member of the rotor 1325. The second member of the stator 1310 being very similar, or even identical, to the first member 1390, except that the second member has its stator electrodes adjusted to ensure that the alternating pattern of stator interdigitated electrodes is maintained perfectly periodic. Said transparent stator interdigitated electrodes being driven by two phases of voltages that are predominantly square wave in nature and having the proper mutual polarity relationship as has already been described. The two phases are maintained by alternating and interdigitated transparent electrodes, as exemplified by transparent electrode 1330 and transparent electrode 1340. The interdigitated electrodes are energized from a two bus structure, 1320 and 1350, on the lower and upper edges of the array. All electrodes are made of Indium Tin Oxide, Zinc Tin Oxide, or other similar transparent conductor material.

Figure 14:
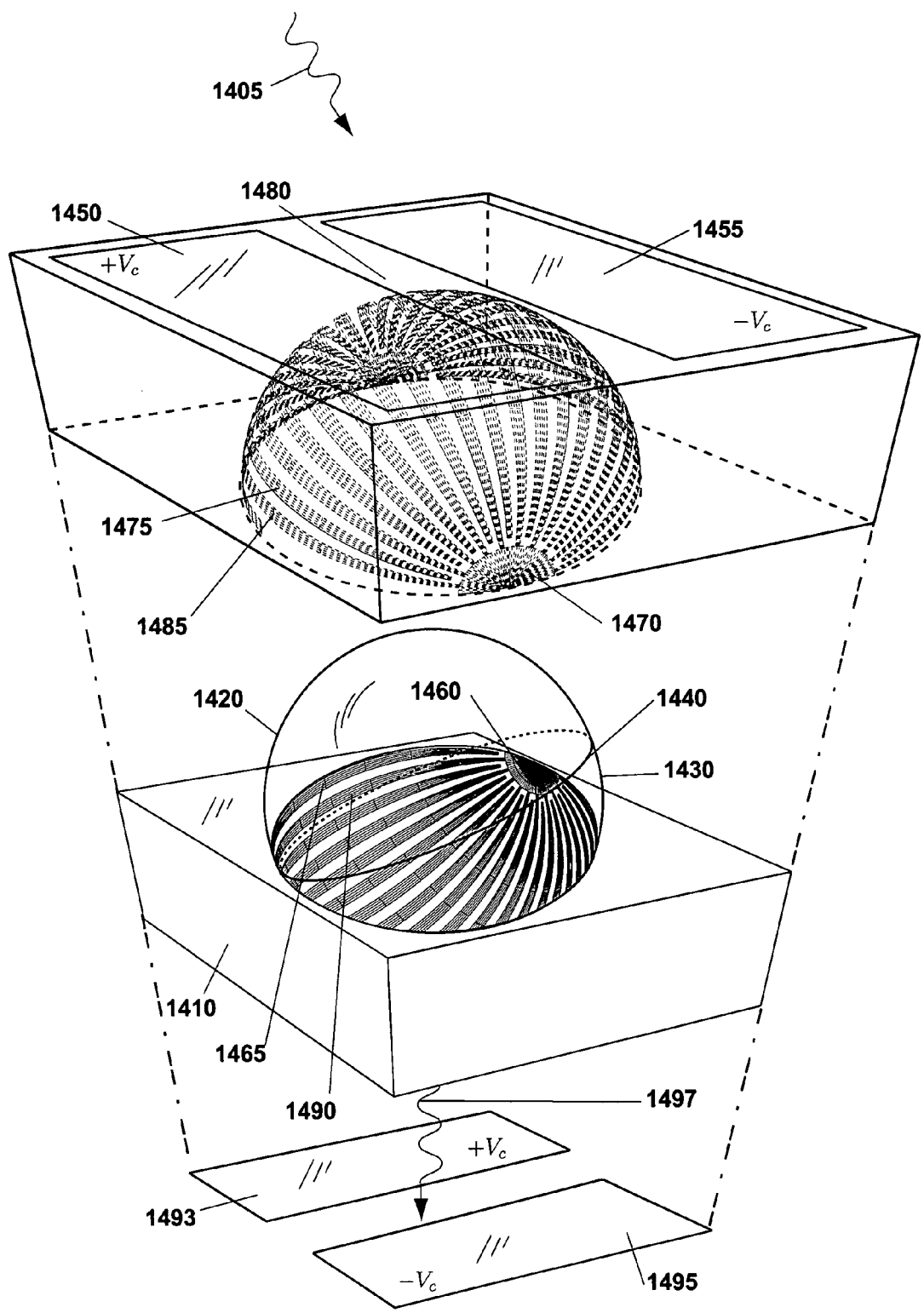
FIG. 14 shows in perspective the operation of a spherical sun tracker array based upon a transparent rotor and stator that have bi-polar charge distributions and voltage induced force perturbations to determine the direction of rotor rotation.

FIG. 14 shows an exploded and perspective view of a single spherical suntenna angle-tracker with two degrees of angle-tracking freedom—azimuth and elevation. Sunlight 1405 impinges on a first surface of the first member of a transparent stator 1480 having refractive index $n_1$. Said sunlight is refracted into the volume of the first member of said transparent stator and proceeds through a set of transparent perturbation electrodes 1450 and 1455, which are on or close to and just beneath said first surface, as well as a set of transparent interdigitated electrodes, exemplified by 1475 and 1485. Said interdigitated electrodes are energized by two phases of voltage square waves with opposite polarities at the polar regions of the interdigitated electrodes. The combination of interdigitated electrodes and perturbation electrodes provides a means to impart a desired resultant torque on a transparent electret rotor having a bound volume charge therein, which interact with the electric fields of said perturbation electrodes to produce a desired torque.

Another set of interdigitated transparent electrodes are positioned on or just beneath the first surface of the second member of a transparent stator 1410. An example of two such electrodes are 1465 and 1490. Said interdigitated electrodes are energized from bus structures in the form of disk-like conductive regions such as 1470 of the first member of said transparent stator and 1460 on the second member of said transparent stator electrodes. The wires that connect to these bus structures are not critical for this discussion and are not shown in FIG. 14. Said interdigitated electrodes on the second surface of the first member of said transparent stator and said interdigitated electrodes on the first surface of the second member of said transparent stator being oriented in space relative to each other to provide bi-stable rotational instability in two non-planar and angular directions. Thereby allowing both azimuth and elevation orientations of a refractive boundary 1440 of a transparent rotor to be changed. As in the case described above for the first member of said transparent stator the second member of said transparent stator also has a set of perturbation electrodes 1493 and 1495, which provide the needed force perturbation on said electret rotor.

Sunlight that has passed through the volume of the first member of said transparent stator also passes undeviate by a process of null refraction through the thin gap of refractive index $n_3$ between said rotor and stator. Sunlight thereby travels into the volume of the first member of the rotor 1420 having refractive index $n_1$. The sunlight next encounters a second member 1430 of said transparent rotor having refractive index $n_2$. The refractive index of each member of said transparent rotor being matched to the first and second members of said transparent stator respectively. The first and second members of said transparent rotor forming an optical boundary 1440 where refraction can take place to redirect sunlight substantially to a new direction of propagation 1497. Another null refraction process occurring as the sunlight leaves the rotor making its way into said second member of said transparent stator. The light now has its optical momentum changed and its direction of travel is in said desired direction 1497.

Figure 15:
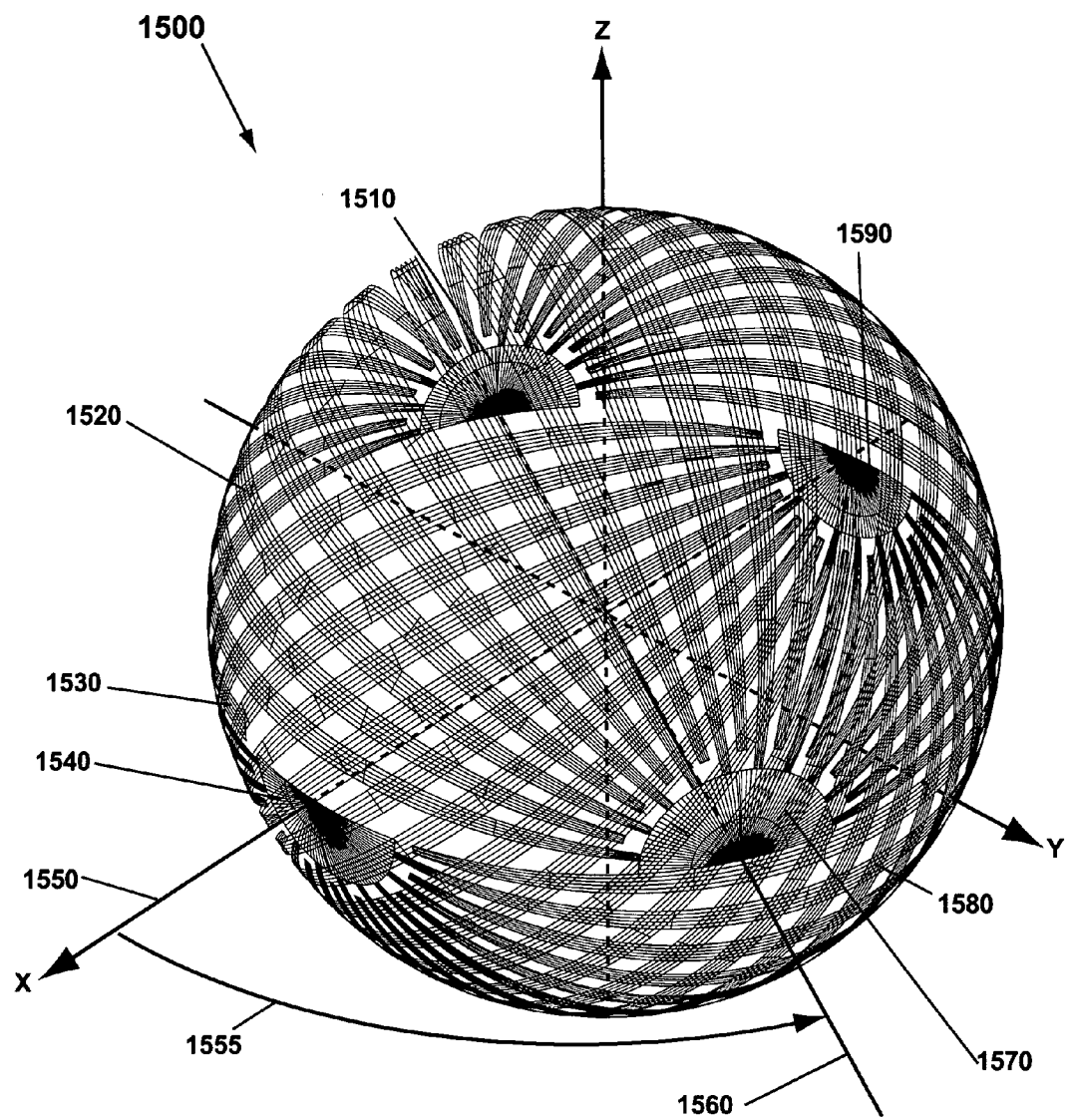
FIG. 15 shows in perspective the geometry of the transparent electrodes used in a spherical stator design.

FIG. 15 shows the full set of transparent interdigitated electrodes 1500 relative to a cartesian coordinate system. The first set of electrodes 1520 are part of the upper hemispherical distribution of electrodes. The second set of electrodes 1580 are part of the lower hemispherical distribution of electrodes. More specifically the first set of electrodes are associated with Z>0 and the lower set of electrodes are associated with Z<0. The symmetry axis of the first upper set of electrodes is 1560, while the symmetry axis of the second lower set of electrodes is 1550. The angular distance 1555 between these symmetry axes determines the amount of rotor rotation in different directions. If said angular separation 1555 is zero then the upper and lower interdigitated electrodes are arranged to only provide one degree of rotational freedom. Alternately, if said angular separation 1555 is 90-degrees then the rotations inspired by the upper 1520 and lower 1580 sets of electrodes are completely decoupled. This provides the greatest amount of control over the motion of the spherical rotor.

When an array of suntenna are utilized to track and capture sunlight it often makes sense to provide an angular separation 1555 between 0-degrees and 90-degrees. One particularly important case is when the angular separation 1555 is 60-degrees. As will be seen shortly this case allows for the greatest packing density of the suntenna rotors. This case also has some mixing of the rotations that are provided by the upper and lower interdigitated electrodes so that a controller must account for the mixing of rotations for accurate tracking of the sun. Nonetheless, the embodiment associated with an angular separation 1555 of 60-degrees is considered the preferred embodiment to allow maximum collection of sunlight by a close packed single-layer array. If multiple layers of suntenna elements are used, that is another planar array on a different Z-plane in addition to the already mentioned array then the preferred embodiment is an angular separation of 1555 of 90-degrees in a more sparse array environment on each layer.

Along the symmetry axis 1560 are positioned the voltage-bus end-caps 1510 and 1570. Along the symmetry axis 1550 are positioned the voltage-bus end-caps 1540 and 1590. These voltage busses support the two phases associated with the alternating electrode voltages. Note that for non-zero angular separation 1555 between the symmetry axes 1550 and 1560 it will be necessary to modify at least one electrode 1530 to avoid shorting it out on an interfering electrode or bus structure. The electrode 1530 was truncated but other possible modifications are also possible, such as reducing the width of this one electrode to avoid any short circuit condition.

Figure 16:
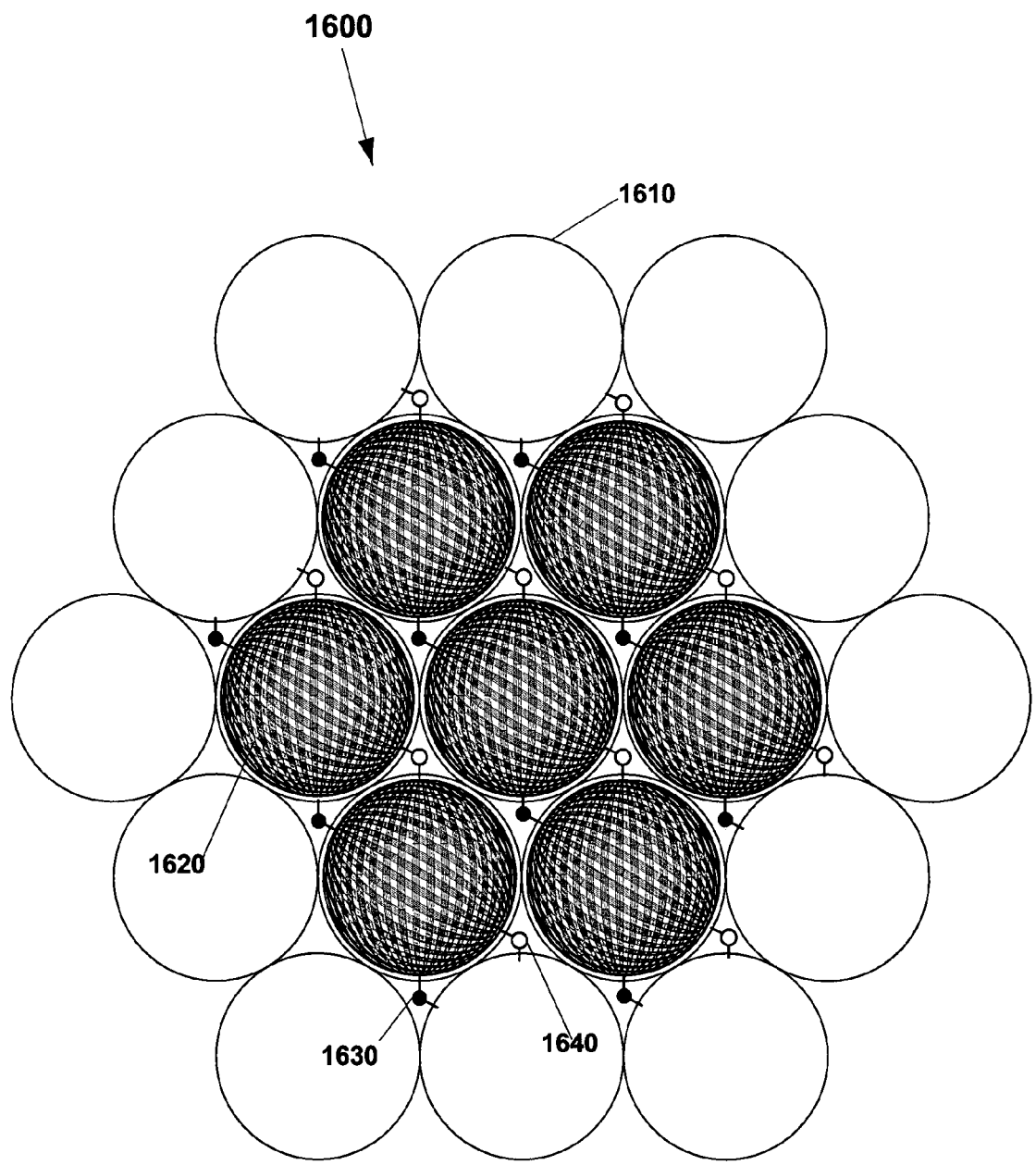
FIG. 16 shows a top view and a cut-away view of an of spherical suntennas as well as the local electrical connections used to energize the stator electrodes.

FIG. 16 shows a top view of an array of interdigitated electrodes 1620 in a close packed array 1600. The angular separation 1555 for each of the elements is 60-degrees. The boundary of the spherical stator void used to hold each rotor is exemplified by 1610. As can be seen each suntenna has two phases of voltages distributed by four voltage feed points that energize the four bus structures associated with each suntenna. Each symmetry axis 1550 and 1560 has two of the four voltage feed points. In the figure the phase of the feed point is depicted by either a dark filled circle 1630 or a no-fill circle 1640. Clearly, neighboring suntenna share voltage feed points located between them. Voltage feed points, such as 1630 and 1640, are wired by providing conductive via pathways through the transparent stator to a power supply layer. This level of detail is not critical for this discussion and the details have been suppressed to avoid unnecessary complexity.

Figure 17:
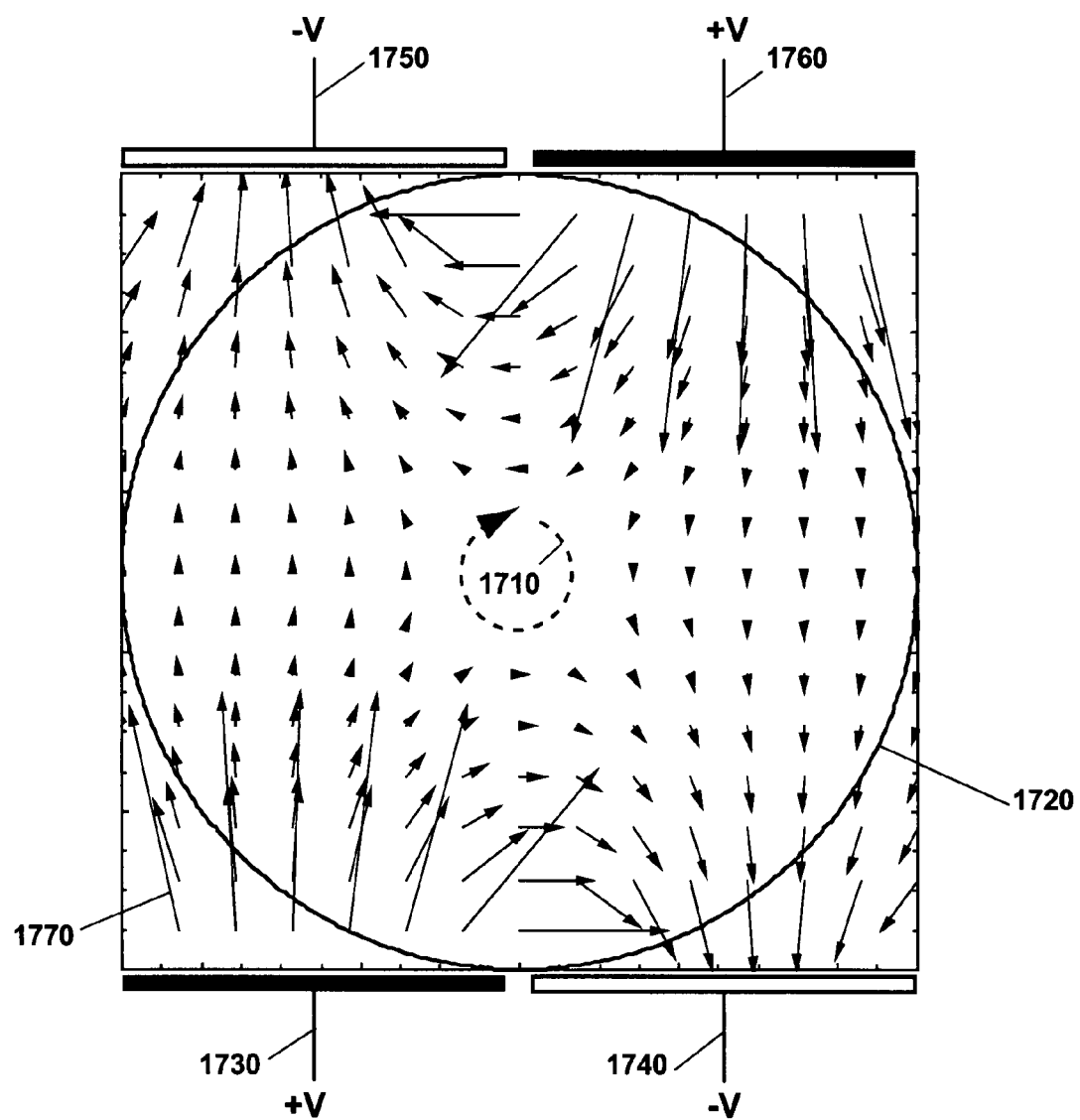
FIG. 17 shows an alternate mechanism for electric fields to induce forces in a transparent electret rotor.

FIG. 17 shows an alternative mechanism for inducing forces into a transparent electret rotor. In the previous discussions the perturbation electrodes that are side by side, such as 1230 and 1240 in FIG. 12 or electrodes 1450, 1455, 1493, and 1495; are shown to induce tangential forces due to fringing fields such as 1245. However, depending on the width, spacing, and arrangement of adjacent electrodes it is also possible to primarily induce body forces in said transparent electret rotor by using the fields that are predominantly normal to the electrode plate. As an illustration of this principle in FIG. 17 we have an electret rotor having a uniform positive charge distribution and relatively large electrodes 1730, 1740, 1750, and 1760 positioned as indicated and having the indicated voltage distributions. Analysis shows that the direction of perturbation torque is very much dependent on the many parameters chose for the design including sizes and orientation of electrodes, voltage levels used, and electret charge distribution. For example in FIG. 17 the electric field vectors that are normal to the electrode shown are responsible for a torque 1710 that is opposite to that indicated in FIG. 12. The scope of this invention covers these and other combinations of said electric means to induce actuation of said transparent electret rotor.

CONCLUSION, RAMIFICATION, AND SCOPE

Accordingly, the reader will see that this invention for controlling the flow of solar energy using an array of flat optical boundaries between different refractive index media has the following advantages:

1. it permits a precision control of the redirection of the light;
2. it permits high concentration of sunlight to be achieved directly by using a plurality of rotors redirecting light to a common focal point;
3. it permits high concentration of sunlight to be achieved within an independent concentrating element said suntennas;
4. it permits electronic tracking of the sun;
5. it permits thermal control by simple optical coatings on the stator and/or rotor;
6. it permits many prior art non-imaging concentrators to become tracking concentrators without the need for additional design;
7. it permits easy insertion into a building integrated optical system;

8. it permits easy insertion into a vehicle integrated optical system;
9. it permits easy tracking of the sun for subsequent energy conversion processes.

While the above description contains many specificities, these should not be construed as limiting the scope of the invention but as merely providing illustrations of some of the presently preferred embodiments of this invention. The present invention is thus not limited to the embodiments described above, but can be changed or modified in various ways on the basis of the general principles of the invention, and such changes or modifications are not excluded from the scope of the invention. Thus the scope of the invention should be determined by the appended claims and their legal equivalents, and not by the examples given.

The invention claimed is:

1. A solid-state transmission-mode optical system for tracking a light source, comprising:
   a. a first member of a transparent rotor having a first refractive index,
   b. a second member of said transparent rotor having a second refractive index,
   c. a first member of a transparent stator also having said first refractive index,
   d. a second member of said transparent stator also having said second refractive index,
   e. a flat optical boundary, positioned between said first and said second members of said transparent stator, and formed by the physically contiguous joining of said first and said second members of said transparent rotor, wherein said first refractive index is different from said second refractive index, and said first and second refractive indices are selected to enable refractive transmission of light across the optical boundary of said first and second members of said transparent rotor in a predetermined output direction for receiving refracted light from the light source, and
   f. a means to induce a torque in a desired direction on the entirety of said first and said second members of said transparent rotor relative to said first and said second members of said transparent stator, whereby the induced torque on said transparent rotor, relative to said transparent stator, causes said transparent rotor to track said light source so that light passing through the said transparent rotor is refracted at said optical boundary and causing said light to be redirected to a desired output direction for concentration, distribution, or energy conversion.

2. The system for redirecting light in claim 1 wherein said optical system for tracking light is arrayed into an array having one degree of angle-tracking freedom.

3. The system for redirecting light in claim 1 wherein said optical system for tracking light is arrayed into an array having two degrees of angle-tracking freedom.

4. The system for redirecting light in claim 1 wherein said transparent rotor is cylindrical.

5. The system for redirecting light in claim 1 wherein said transparent rotor is spherical.

6. The system for redirecting light in claim 1 wherein said transparent rotor and said transparent stator contain optical coatings at one or more boundaries in order to suppress reflections and selectively suppress the passage of certain wavelengths of light.

7. The system for light redirection in claim 1 wherein said redirected light is used to produce power.

8. The system for light redirection in claim 1 wherein said redirected light is used to produce light at a user defined level of concentration.

9. The system for light redirection in claim 1 wherein said redirected light is used to produce electricity.

10. The system for light redirection in claim 1 wherein said redirected light is used to produce stored electrical energy.

11. The system for light redirection in claim 1 wherein said redirected light is used to produce stored chemical energy.

12. The system for light redirection in claim 1 wherein said redirected light is used to produce desalinated water.

13. The system for light redirection in claim 1 wherein said redirected light is used to process materials.

14. The system for light redirection in claim 1 wherein said redirected and concentrated light is used to power a vehicle by storing the energy in real time and then consuming said stored energy at a later time.

15. The system for light redirection in claim 1 wherein said means to induce a torque is based on electric forces.

16. The system for light redirection in claim 1 wherein said means to induce a torque is based on magnetic forces.

17. The system for light redirection in claim 1 wherein said means to induce a torque is based on mechanical forces from the thermal expansion or contraction of materials.

18. The system for light redirection in claim 1 wherein said means to induce a torque is based on the expansion or contraction of a hydrogel or active polymer.

19. The system for light redirection in claim 1 wherein said means to induce a torque is based on acoustic waves.

20. The system for light redirection in claim 1 wherein said rotor and said stator have a means to accurately determine absolute angular position relative to each other.

21. A solid-state transmission-mode optical system for tracking a light source, comprising:
   a. a first member of a transparent electrically-resistive electret rotor having a first refractive index and a first bound charge distribution,
   b. a second member of said transparent electrically-resistive electret rotor having a second refractive index and a second bound charge distribution,
   c. a first member of a transparent stator also having said first refractive index,
   d. a second member of said transparent stator also having said second refractive index,
   e. a flat optical boundary, positioned between said first and said second members of said transparent electrically-resistive electret rotor, and formed by the physically contiguous joining of said first and said second members of said transparent electrically-resistive electret rotor, wherein said first refractive index is different from said second refractive index, and said first and second refractive indices are selected to enable refractive transmission of light across the optical boundary of said first and second members of said transparent rotor in a predetermined output direction for receiving refracted light from the light source, and
   f. an array of torque inducing electrodes positioned on said transparent stator for creating an unstable, but controllable, torque system on said transparent electrically-resistive electret rotor,
   g. an array of perturbation electrodes, separate and distinct from said torque electrodes, to select a particular torque direction from said unstable, but controllable, torque system, whereby said torque inducing electrodes induce unbound charges having a relatively large capacitive-resistive time-constant relative to the desired rotor speed on said transparent and electrically-resistive electret rotor, and further creating a torque relative to said transparent stator and causing said transparent electrically-resistive electret rotor to track said light source so that light passing through said transparent electrically-resistive electret rotor is refracted at said optical boundary, causing said light to be redirected to a desired output direction.

22. The system for light redirection in claim 21 wherein said perturbation electrodes have a discrete geometry.

23. The system for light redirection in claim 21 wherein said perturbation electrodes have a continuous geometry.

24. The system for redirecting light in claim 21 wherein said optical system for tracking light is arrayed into an array having one degree of angle-tracking freedom.

25. The system for redirecting light in claim 21 wherein said optical system for tracking light is arrayed into an array having two degrees of angle-tracking freedom.

26. The system for redirecting light in claim 21 wherein said transparent electrically-resistive electret rotor is cylindrical.

27. The system for redirecting light in claim 21 wherein said transparent electrically-resistive electret rotor is spherical.

28. The system for redirecting light in claim 21 wherein said transparent electrically-resistive electret rotor and said transparent stator contain optical coatings at one or more boundaries.

29. The system for light redirection in claim 21 wherein said redirected light is used to produce power.

30. The system for light redirection in claim 21 wherein said redirected light is used to produce light at a user defined level of concentration.

31. The system for light redirection in claim 21 wherein said redirected light is used to produce electricity.

32. The system for light redirection in claim 21 wherein said redirected light is used to produce stored electrical energy.

33. The system for light redirection in claim 21 wherein said redirected light is used to produce stored chemical energy.

34. The system for light redirection in claim 21 wherein said redirected light is used to produce desalinated water.

35. The system for light redirection in claim 21 wherein said redirected light is used to process materials.

36. The system for light redirection in claim 21 wherein said redirected and concentrated light is used to power a vehicle by storing the energy in real time and then consuming said stored energy at a later time.

37. The system for light redirection in claim 21 wherein said means to induce a torque is based on electric forces.

38. The system for light redirection in claim 21 wherein said means to induce a torque is based on magnetic forces.

39. The system for light redirection in claim 21 wherein said means to induce a torque is based on mechanical forces from the thermal expansion or contraction of materials.

40. The system for light redirection in claim 21 wherein said means to induce a torque is based on the expansion or contraction of a hydrogel or active polymer.

41. The system for light redirection in claim 21 wherein said means to induce a torque is based on acoustic waves.

42. The system for light redirection in claim 21 wherein said transparent electrically-resistive electret rotor and said stator have a means to accurately determine absolute angular position relative to each other.

* * * * *